Nov. 6, 1934.    R. W. BAKER ET AL    1,979,434
COMMUTATOR ASSEMBLING MACHINE
Filed Nov. 21, 1931    15 Sheets-Sheet 1

Inventors
Russell W. Baker
John Q. Holmes
Alva N. Phelps
by Spencer Hardman & Fehr
their Attorneys

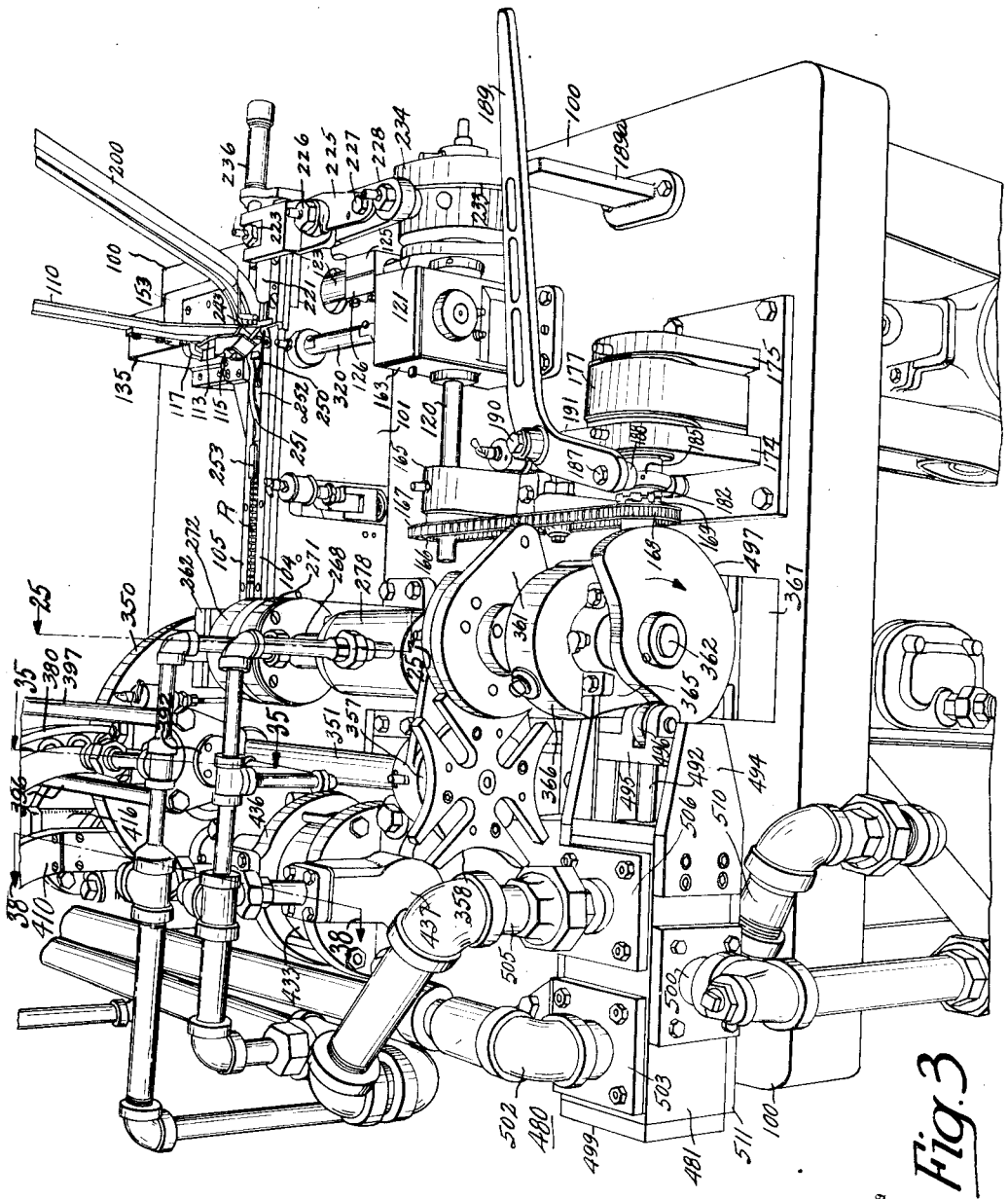

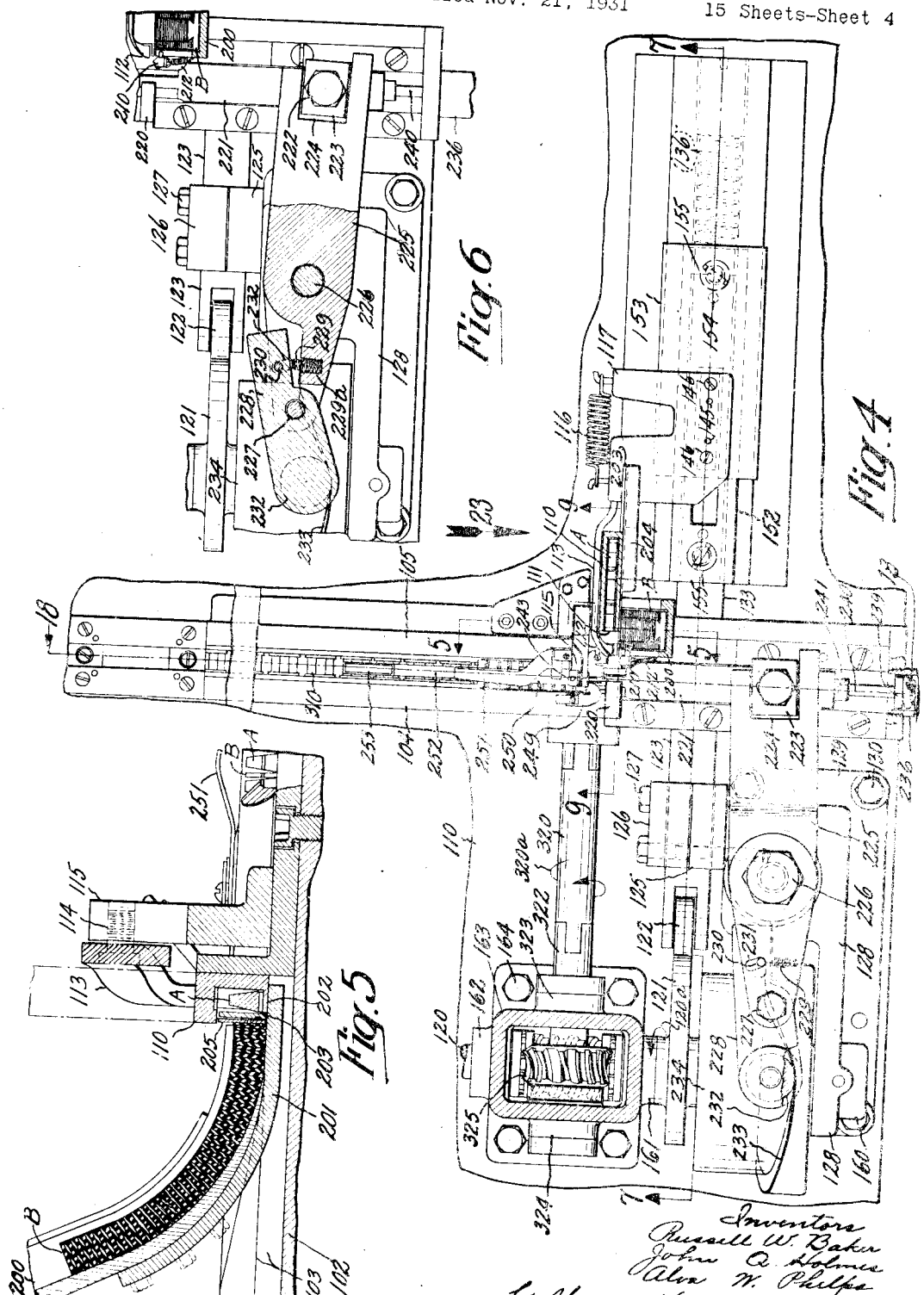

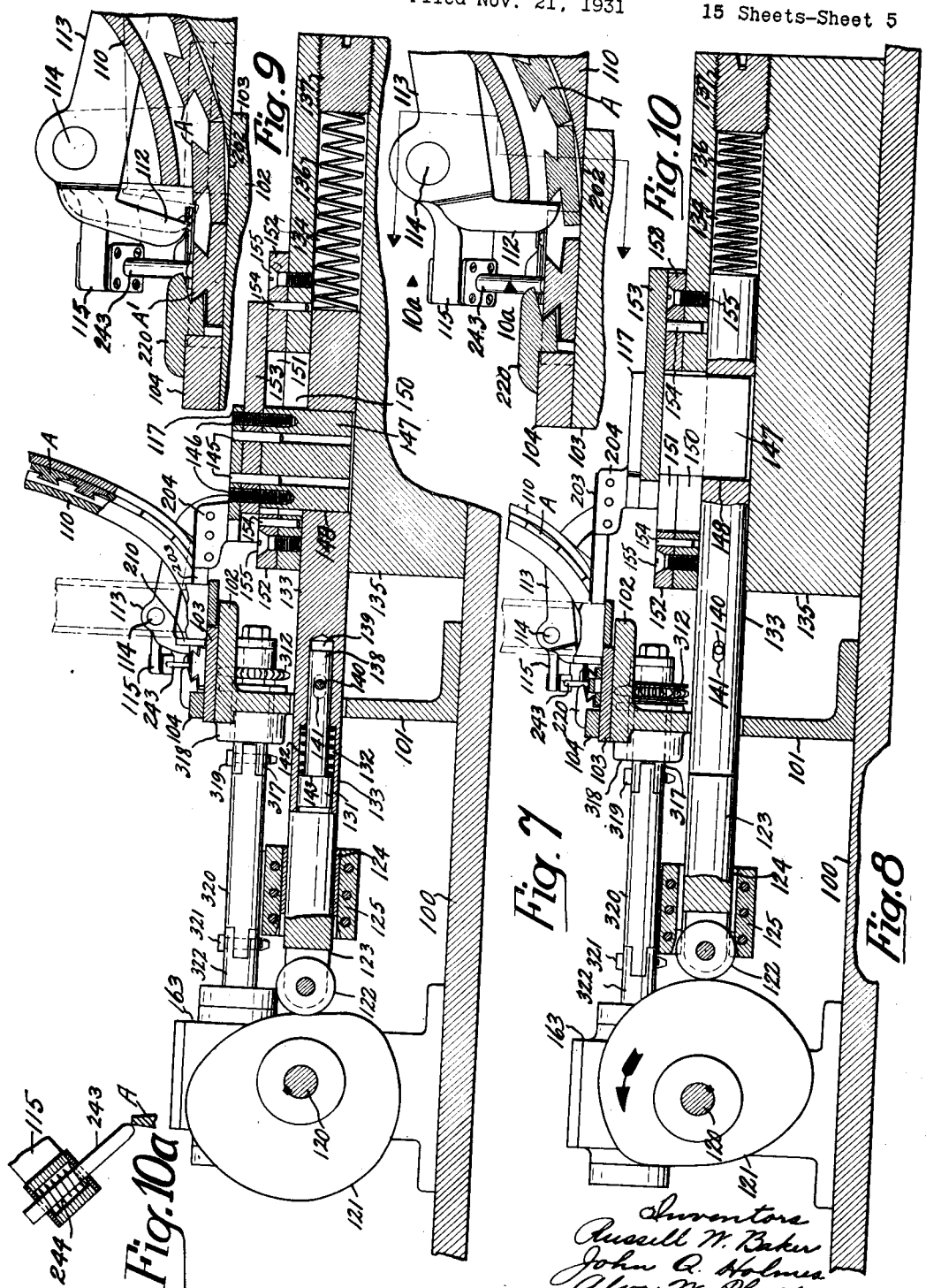

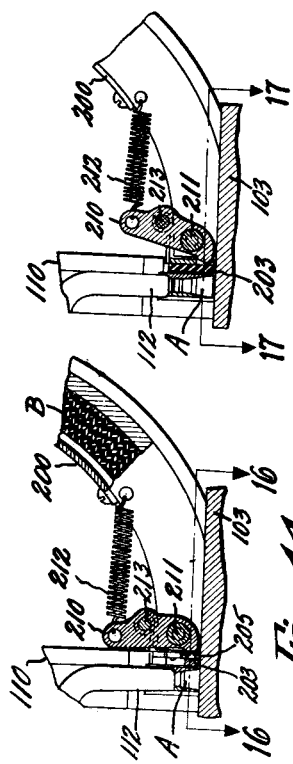

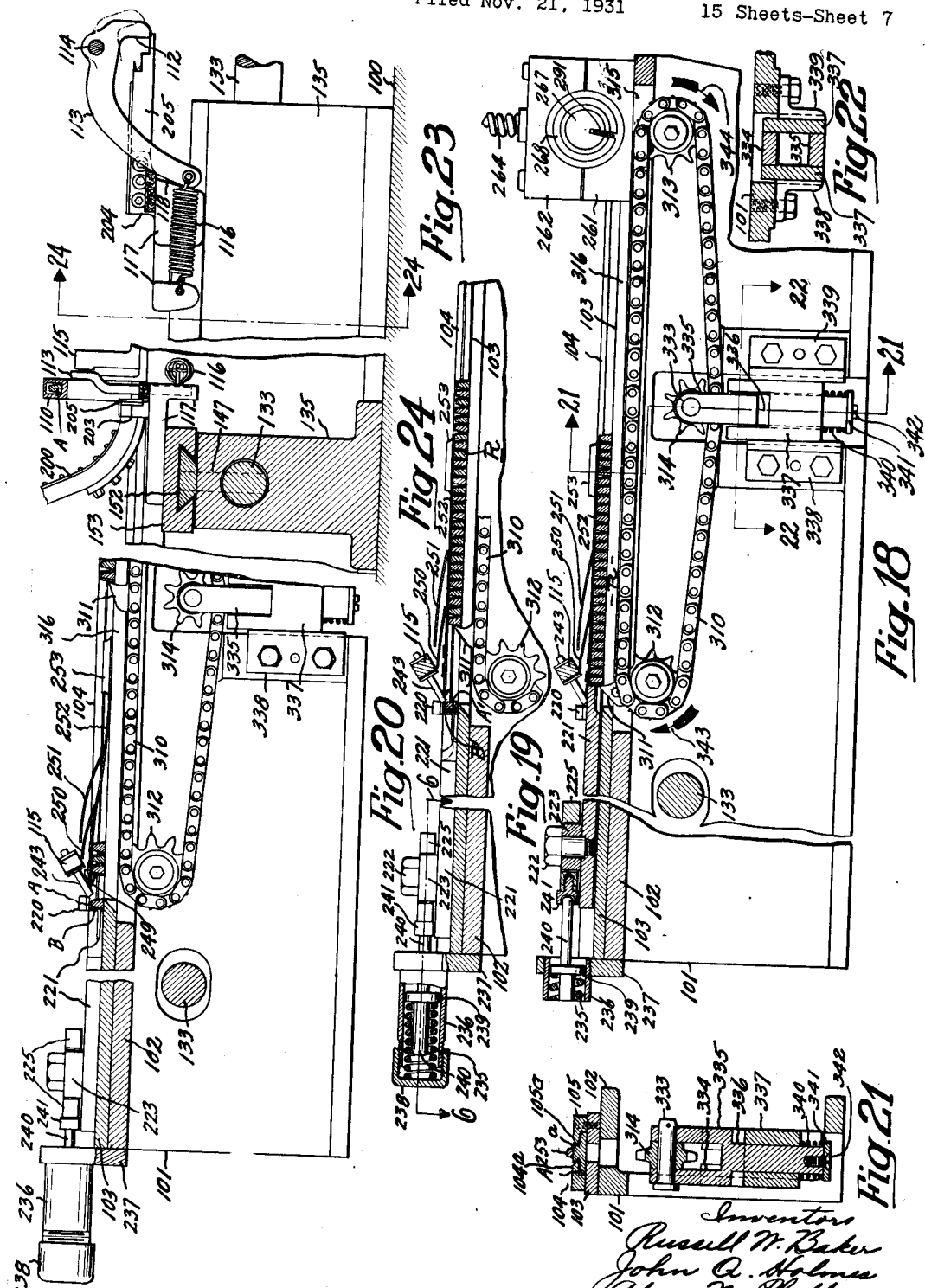

Nov. 6, 1934.                R. W. BAKER ET AL                1,979,434
                        COMMUTATOR ASSEMBLING MACHINE
                          Filed Nov. 21, 1931          15 Sheets-Sheet 9
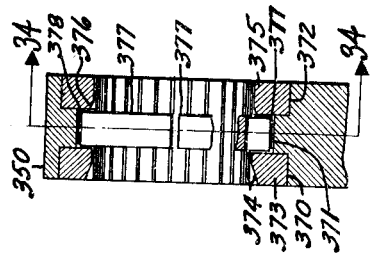
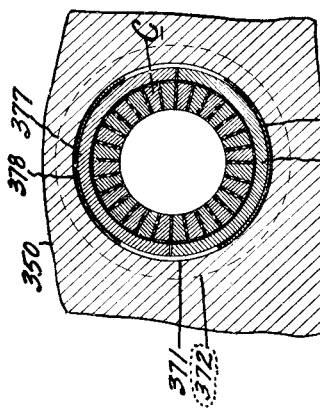
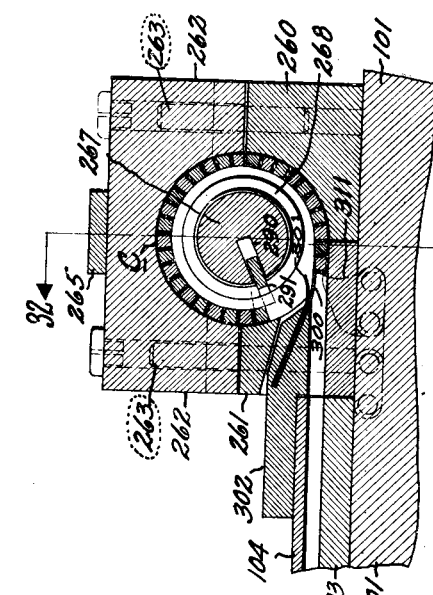
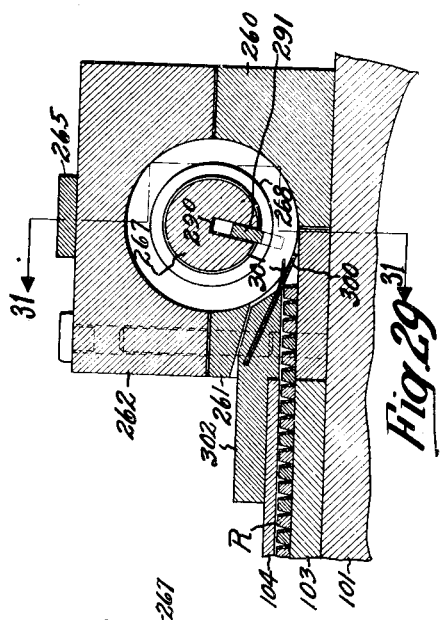
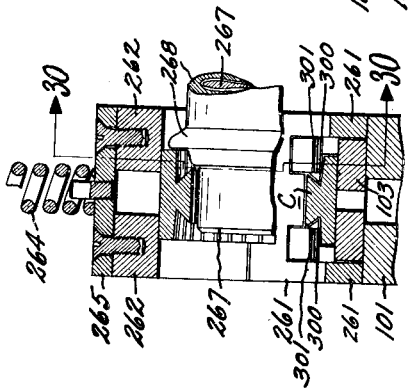
Inventors
Russell W. Baker
John Q. Holmes
Alva W. Phelps
by Spencer Hardman & Fehr their attorney

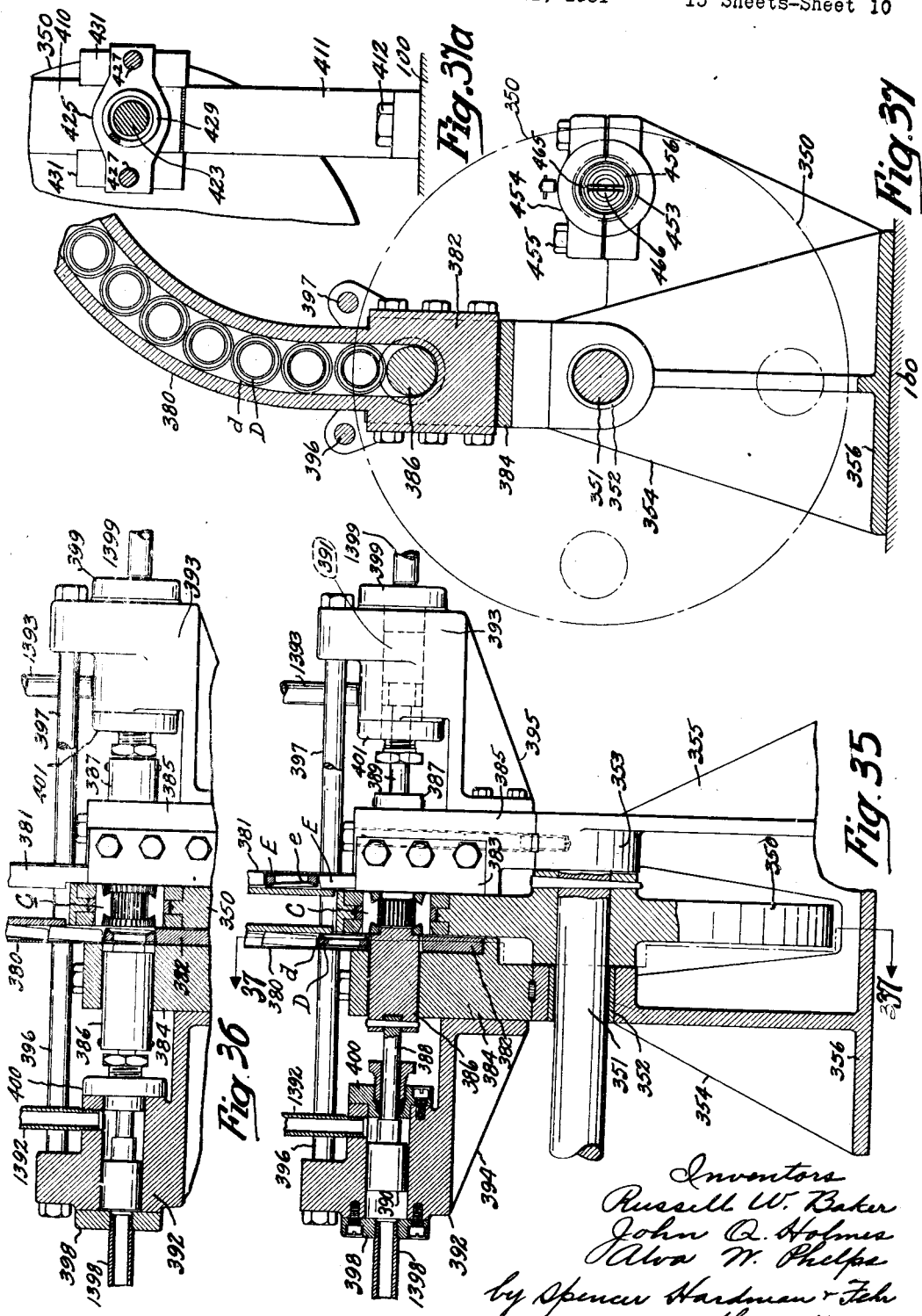

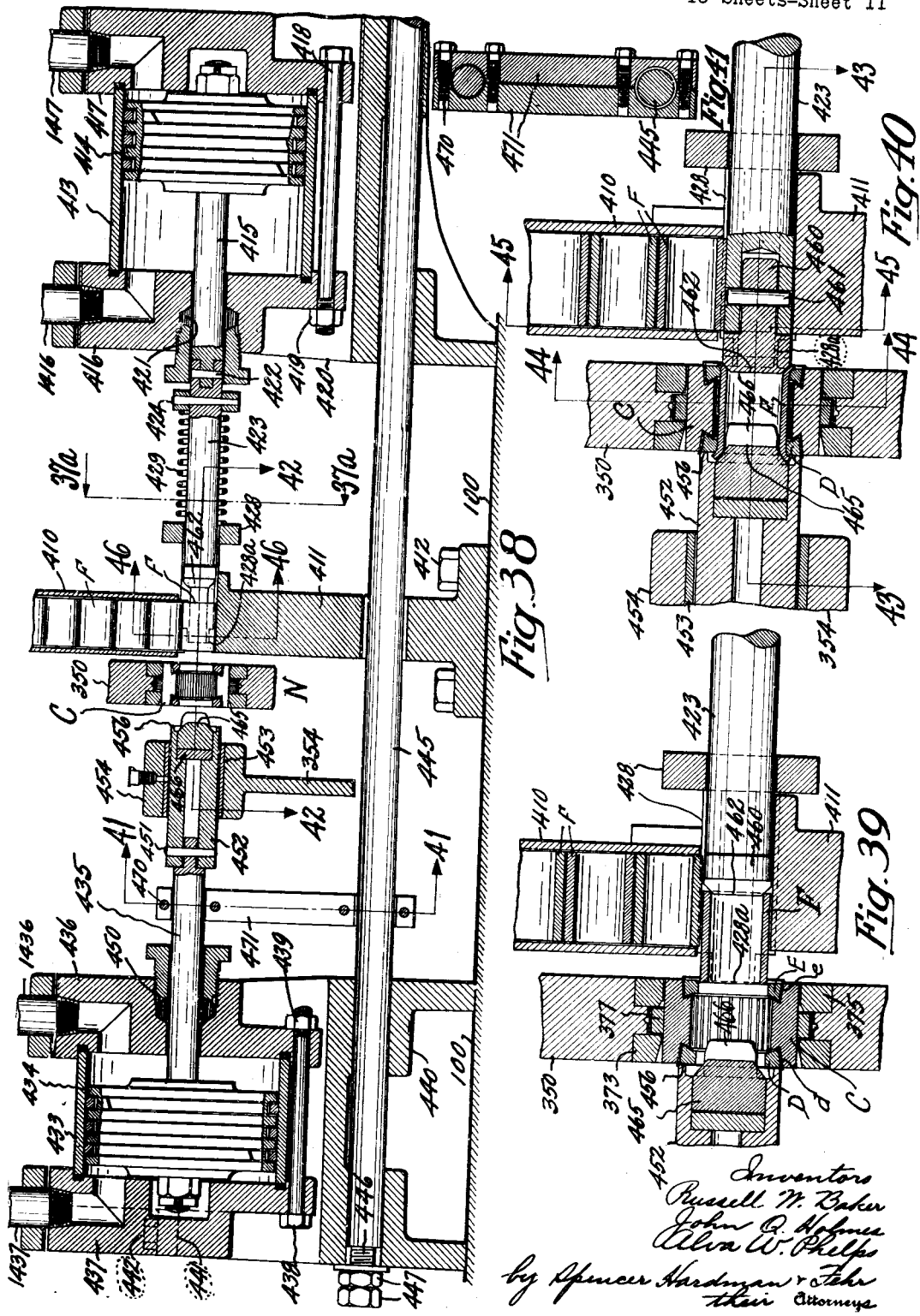

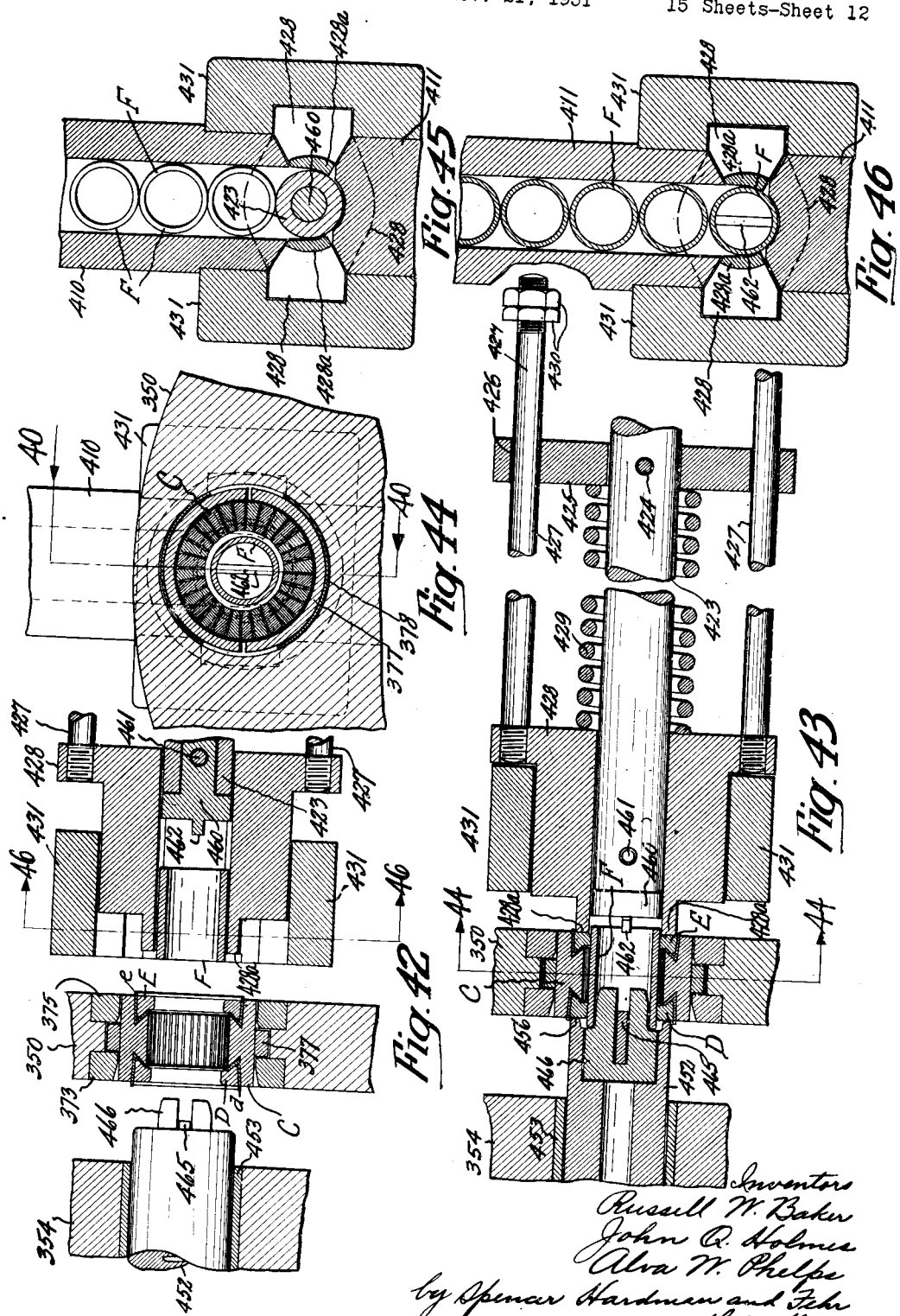

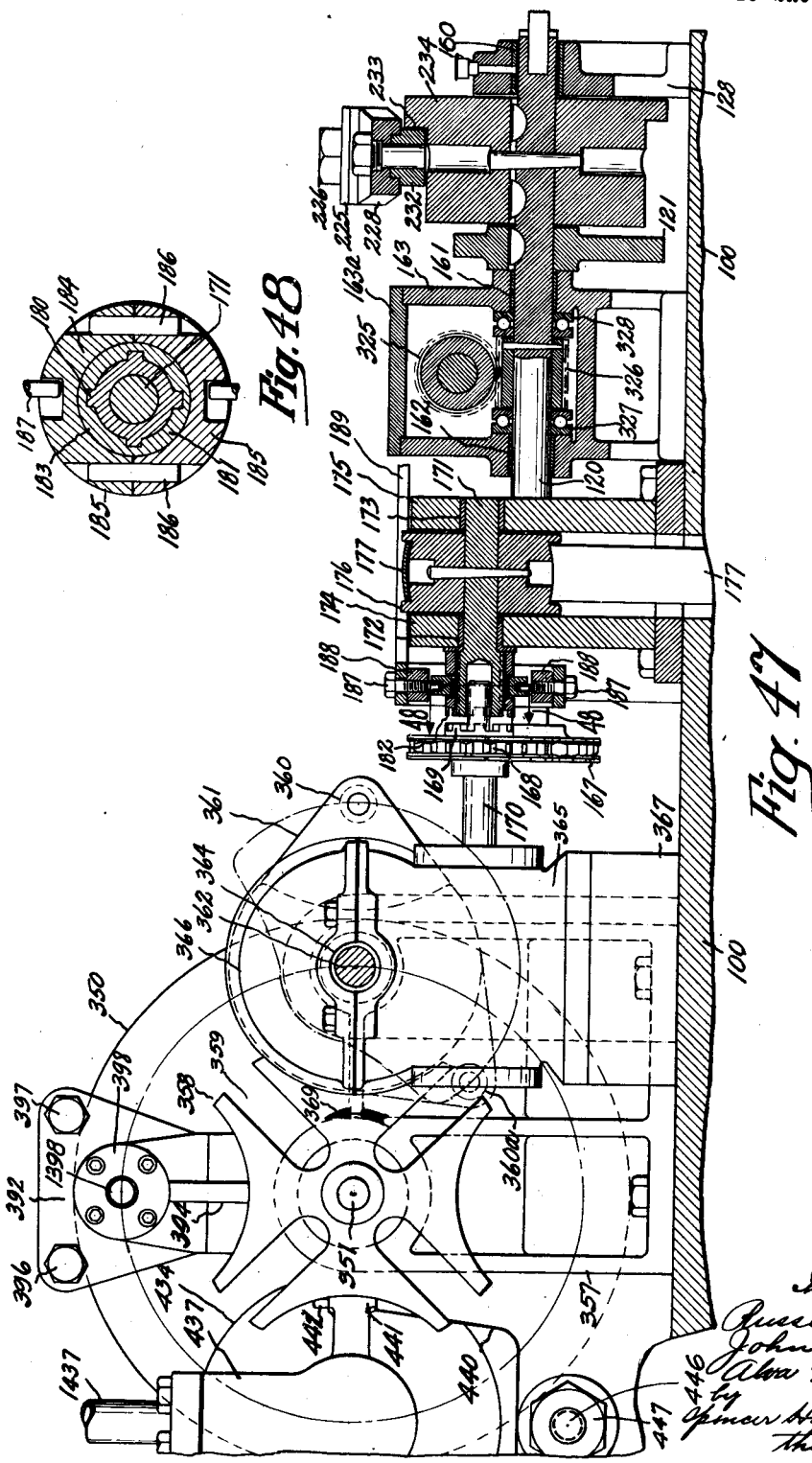

Nov. 6, 1934.    R. W. BAKER ET AL    1,979,434
COMMUTATOR ASSEMBLING MACHINE
Filed Nov. 21, 1931    15 Sheets-Sheet 14

Inventors
Russell W. Baker
John Q. Holmes
Alva W. Phelps
by Spencer Hardman & Fehr
their attorneys Patented Nov. 6, 1934

1,979,434

UNITED STATES PATENT OFFICE 1,979,434

COMMUTATOR ASSEMBLING MACHINE

Russell W. Baker, John Q. Holmes, and Alva W. Phelps, Anderson, Ind., assignors, by mesne assignments, to General Motors Corporation, Detroit, Mich., a corporation of Delaware Application November 21, 1931, Serial No. 576,494

126 Claims. (Cl. 29—84)

This invention relates to apparatus for assembling commutators of dynamo electric machines, particularly commutators comprising an annulus of metallic segments alternating with insulating segments and clamped together by means of clamping rings which engage the dovetail shaped tangs of the segments, the clamping rings being held in position by a tubular rivet or core which passes through the annulus and ring, the ends of the core being deformed against the outer faces of the clamping ring.

It is a chief object of this invention to provide a machine which will automatically assemble commutators of the type referred to without requiring any manipulation except those of placing work pieces in hoppers or magazines from which the pieces are withdrawn as needed and fed into the machine. This object is accomplished in the disclosed form of the present invention through the agency of means for pushing metal segments and insulating segments from their respective magazines or chutes into positions adjacent the entrance of a track; means for pushing a group of workpieces into the track, one group at a time so that a row of orderly arranged work pieces will be located in the track; means for conveying a row of a predetermined number of groups of orderly arranged workpieces from the track into an annulus forming device which is preferably an annular track leading from the first mentioned track; a conveyor which is preferably a disc conveyor rotatable upon an axis parallel to the axis of the annular track and which carries a plurality of recesses or holes movable into alignment one at a time with the annular track; means for pushing the annulus of segments within the annular track into a workholder recess of the conveyor; means for intermittently moving the conveyor so that each workholder will pass into one or more operating stations; means at one of the stations for assembling clamping rings one at each side of the annulus of segments; means for inserting within the annulus and clamping rings a tubular core which passes through the clamping rings and for deforming the ends of the core against the outer faces of the clamping rings; and means for ejecting the commutator from the conveyor. In a machine for assembling a commutator having no riser bars to prevent the commutator being pushed out of a workholder in the same direction as it is pushed into the workholder, the means for ejecting the commutator from the conveyor can obviously be the means used for pushing the annulus of segments from the annular track into the workholder. In such case, the movement of an unsecured annulus of segments from the annular track to a worker, causes a secured annulus of segments to be pushed from the workholder.

Further objects and advantages of the present invention will be apparent from the following description, reference being had to the accompanying drawings, wherein a preferred embodiment of one form of the present invention is clearly shown.

In the drawings:

Fig. 3 is a perspective view taken from the side opposite from which Fig. 2 is viewed;

Fig. 4 is a plan view on a large scale of a portion of the mechanism for feeding segments into the track which receives the row of segments;

Fig. 5 is a fragmentary sectional view on an enlarged scale the section being taken on the line 5—5 of Fig. 4;

Fig. 6 is a fragmentary view partly in section the section being taken on the line 6—6 of Fig. 19;

Figs. 7 and 8 are fragmentary sectional views taken on the lines 7—7 of Fig. 4 showing the mechanism in two positions of operation;

Figs. 9 and 10 are fragmentary sectional views corresponding to Figs. 7 and 8 respectively and are taken on the line 9—9 of Fig. 4;

Fig. 10a is a fragmentary sectional view on line 10a—10a of Fig. 10.

Fig. 11 is a fragmentary plan view on a larger scale than Fig. 4 showing the mechanism for feeding into the track which receives a row of segments;

Figs. 12 and 13 are similar views showing mechanism in two positions of operation, these views being taken on the line 12—12 of Fig. 11.

Figs. 14 and 15 are similar fragmentary sectional views taken on the line 14—14 of Fig. 13;

Figs. 16 and 17 are fragmentary sectional views taken respectively on line 16—16 of Fig. 14 and 17—17 of Fig. 15.

Figure 27:
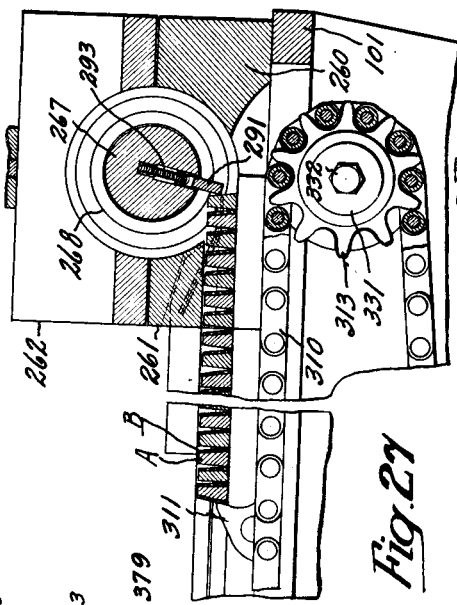
Figure 28:
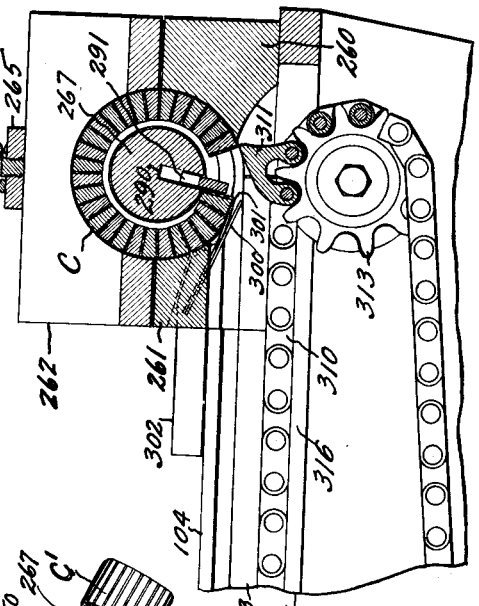
Figure 25:
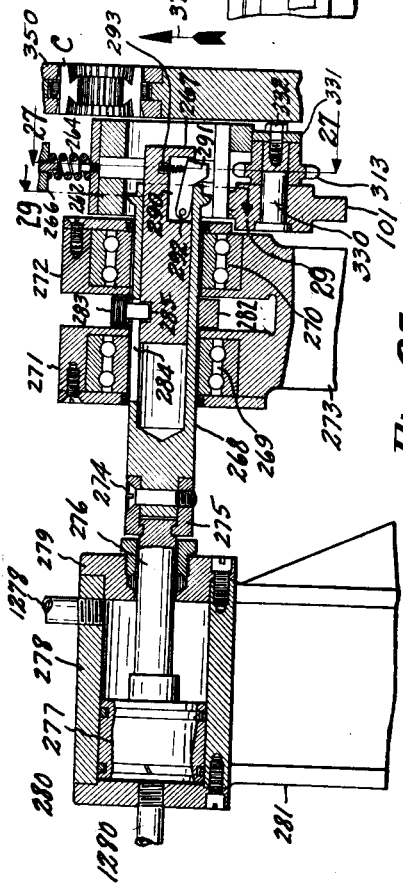
Figure 26:
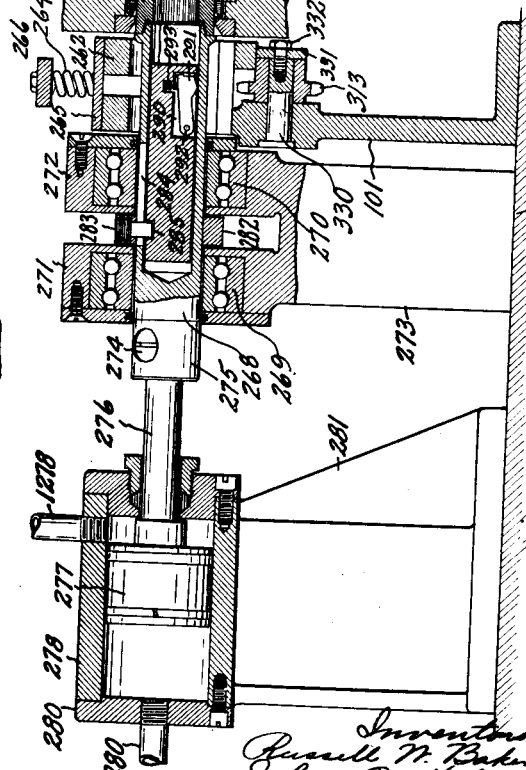

Fig. 18 is a fragmentary sectional view on the line 18—18 of Fig. 4;

Figs. 19 and 20 are fragmentary sectional views of portion of the mechanism of Fig. 18, but Figs. 19 and 20 show other operating positions;

Figs. 21 and 22 are fragmentary sectional views taken respectively on the line 21—21 and 22—22 of Fig. 18;

Fig. 23 is a fragmentary view looking in the direction of the arrow 23 of Fig. 4;

Fig. 24 is a sectional view on line 24—24 of Fig. 23;

Figs. 25 and 26 are fragmentary sectional views taken principally on the line 25—25 of Fig. 3 and show the mechanism in two operating positions;

Figs. 27 and 28 are fragmentary sectional views on a larger scale than Figs. 25 and 26 and are taken on the line 27—27 of Fig. 25 and show the annulus forming mechanism in two operating positions.

Figs. 29 and 30, corresponding somewhat to Figs. 27 and 28, are fragmentary sectional views taken on line 29—29 of Fig. 25. Fig. 29 is also a sectional view on line 29—29 of Fig. 31; and Fig. 30 is a sectional view on the line 30—30 of Fig. 32.

Figs. 31 and 32 are fragmentary sectional views respectively on line 31—31 of Fig. 29, and line 32—32 of Fig. 30.

Fig. 33 is a sectional view on a larger scale than Fig. 25 and shows a cross section of a workholder recess with a commutator therein and a fragment of the means for yieldingly embracing the commutator annulus within the workholder.

Figure 2:
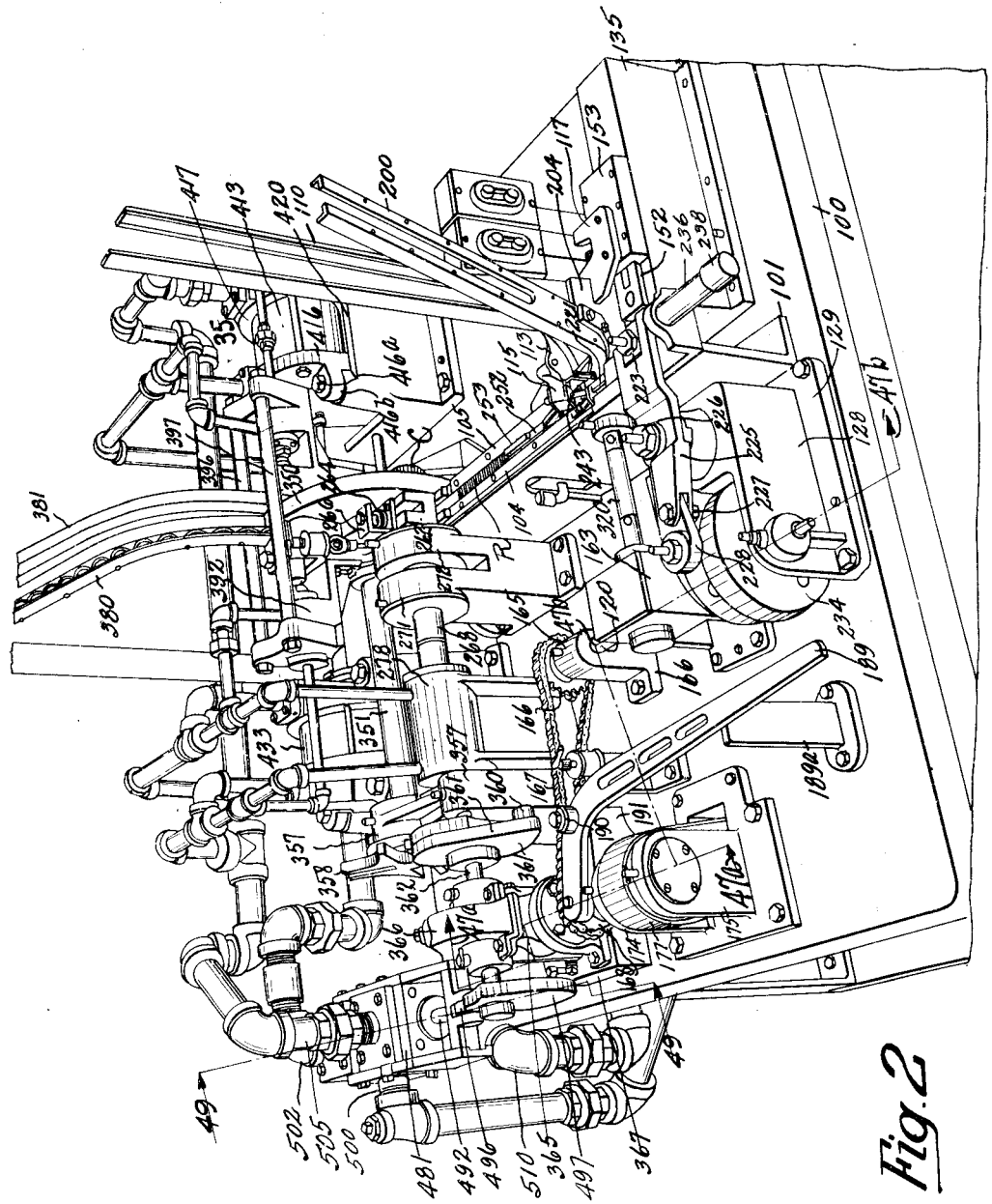
Fig. 2 is a perspective view of the machine taken from a position adjacent the front of the machine.

Fig. 34 is a sectional view on line 34—34 of Fig. 33;

Fig. 35 is a fragmentary view partly in section, the section being taken on a vertical plane passing through the lines 35—35 of Figs. 2 and 3;

Fig. 36 is a view similar to Fig. 35 showing the mechanism in another operating position;

Fig. 37 is a fragmentary sectional view on line 37—37 of Fig. 35;

Fig. 37a is a fragmentary sectional view on line 37a—37a of Fig. 38;

Fig. 38 is a fragmentary sectional view taken principally on a vertical plane passing through the line 38—38 of Fig. 3;

Figs. 39 and 40 are fragmentary sectional views taken on line 40—40 of Fig. 44 and are drawn to a larger scale than Fig. 38 and show the core crimping mechanism in different operating positions;

Fig. 41 is a sectional view on line 41—41 of Fig. 38;

Fig. 42 is a fragmentary sectional view on a larger scale than Fig. 38 and is taken on the line 42—42 of Fig. 38;

Fig. 43 is a view similar to Fig. 42 but is taken on the line 43—43 of Fig. 40;

Fig. 44 is a sectional view on line 44—44 of Fig. 40 and of Fig. 43;

Fig. 45 is a fragmentary sectional view on line 45—45 of Fig. 40;

Fig. 46 is a fragmentary sectional view on the line 46—46 of Figs. 42 and 38.

Fig. 47 is a fragmentary view partly in section the section being taken on vertical planes cutting the section line 47a—47a and 47b—47b, of Fig. 2.

Fig. 48 is a sectional view on the line 48—48 of Fig. 47.

Figure 49:
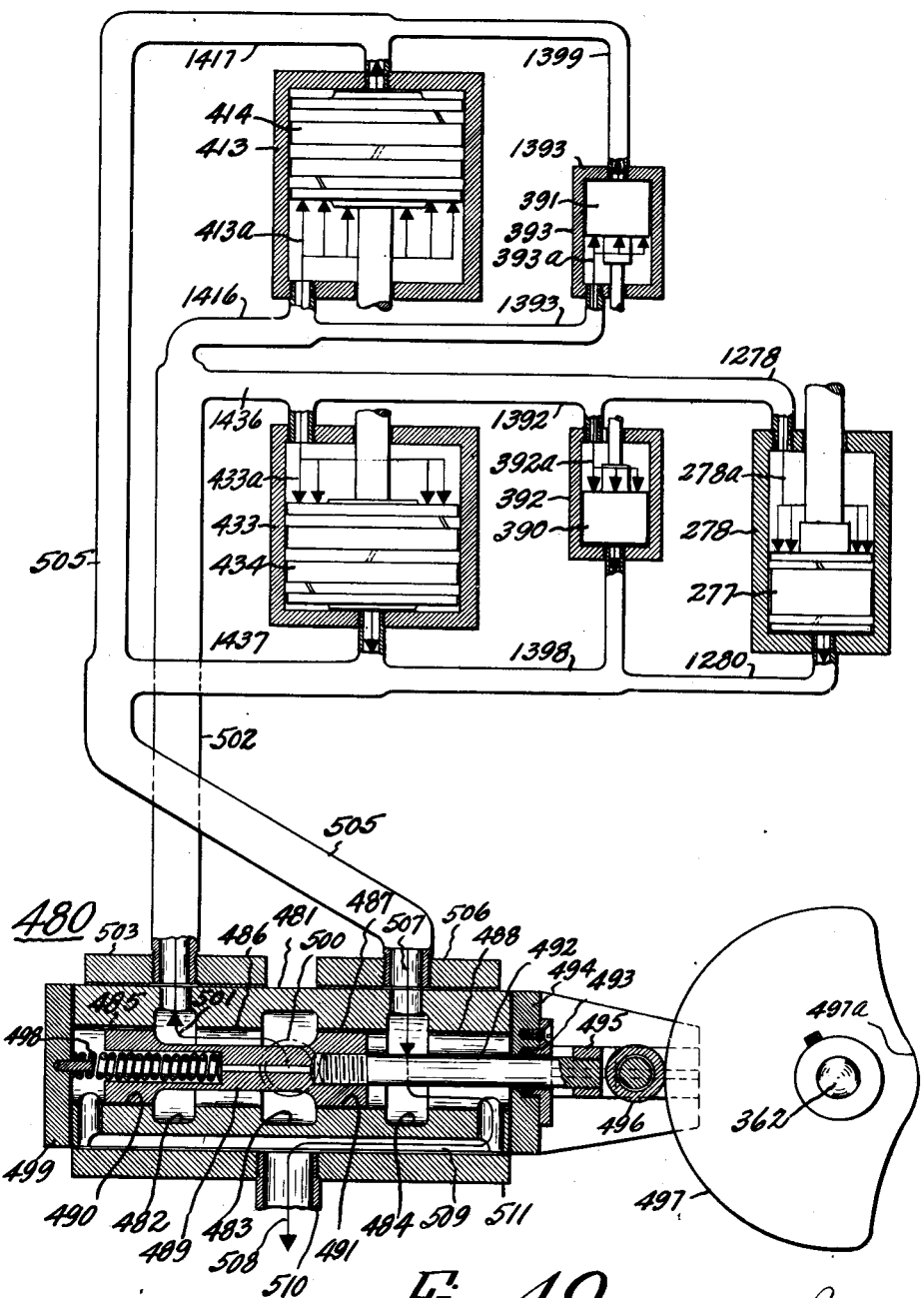

Fig. 49 is a diagram of a hydraulic system for operating mechanisms of the machine, the cylinders and control valve being shown in longitudinal section. Referring to Fig. 2, the section through the control valve is taken on the vertical plane intersecting the line 49—49 of Fig. 2.

Figure 50:
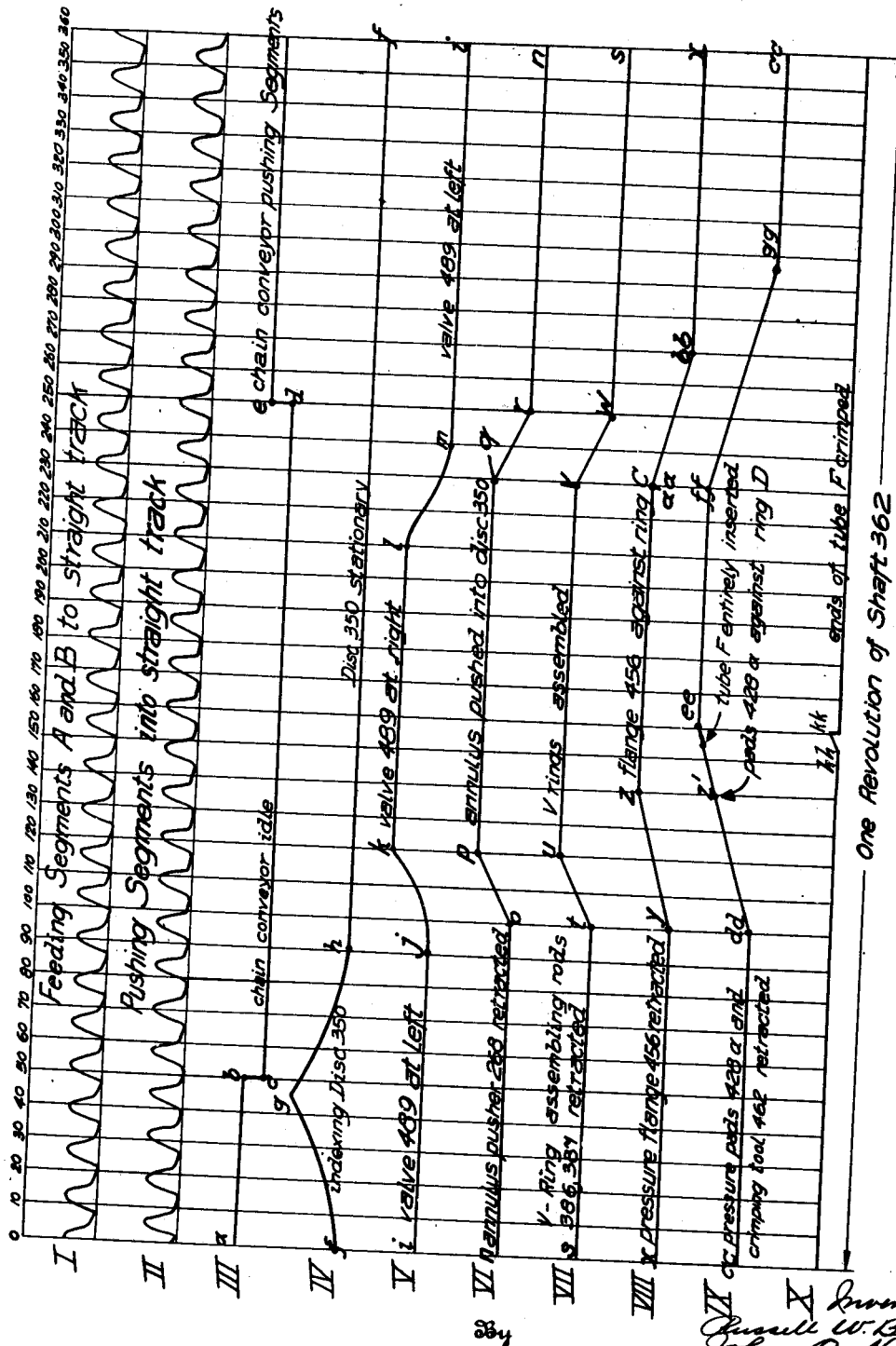

Fig. 50 is a cam chart illustrating the sequence of operations performed by the machine.

Figure 1:
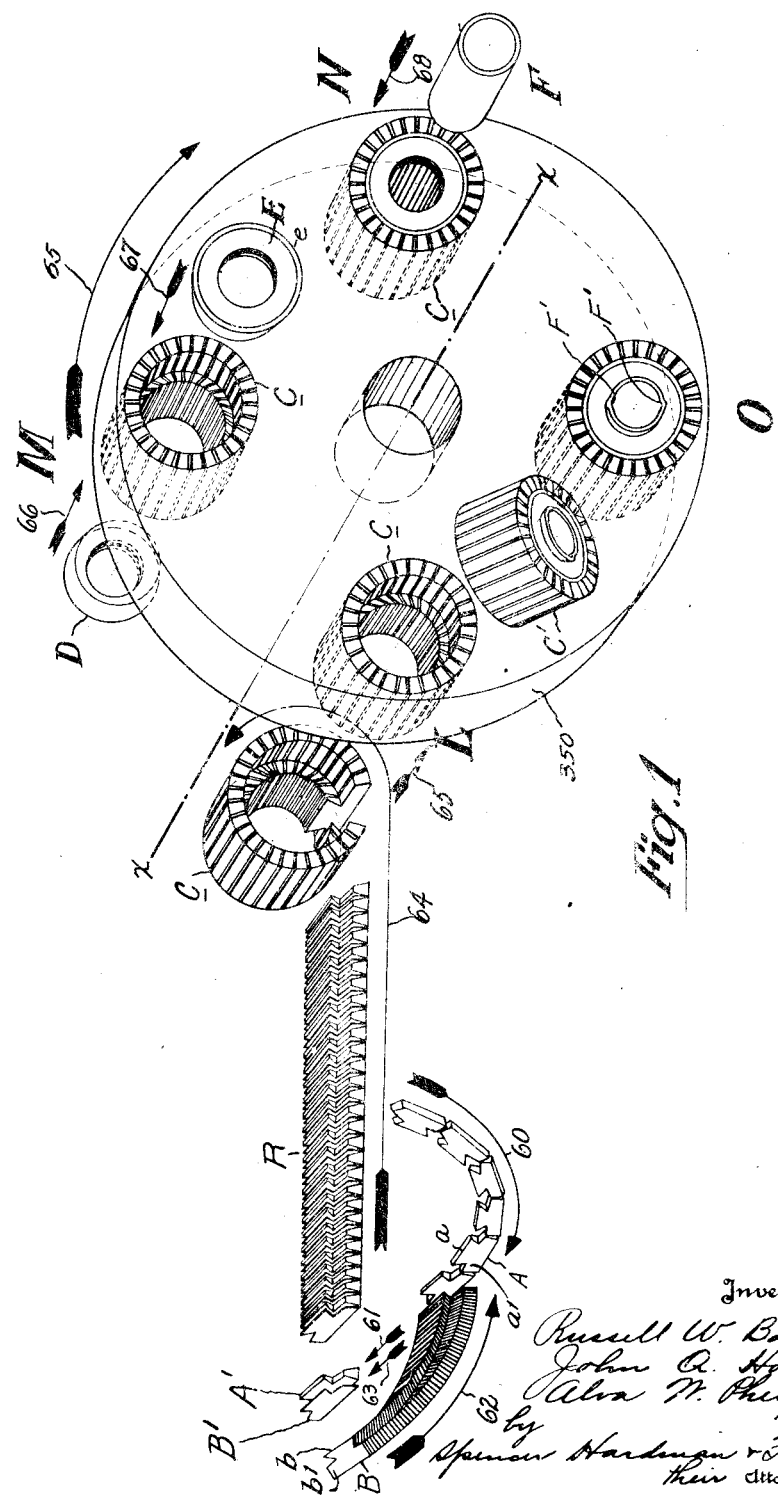
Fig. 1 is a mechanical diagram illustrating the various operations of a machine embodying the present invention.

Referring to Fig. 1, the commutator is formed from metallic segments A having bar portions a1 and dovetail tangs a and insulating segments B having bar portions b1 and dovetail tangs b. The segments A descend through a suitable chute in the direction of the arrow 60 and move in the direction of the arrow 61 into the position A1. The insulating segments B descend through a chute in the direction of the arrow 62 and are pushed in the direction of the arrow 63 to the position B1. The segments A1 and B1 comprise a group of commutator parts which are pushed as a group into a straight track which contains a row R of the groups of segments, each group comprising a metal segment A and an insulating segment B. After a predetermined number of groups of segments have been pushed into the row R these segments are moved by suitable conveyors in the direction of the arrow 64 which causes them to move down the straight track and thence into an annular track to form an annulus C of segments. The annulus C is moved in the direction of arrow 65 into a suitable workholder provided in a conveyor disc 350 rotating on the axis XX which extends parallel to the axis C. The disc 350 rotates in the direction of the arrow 61 and carries the annulus C from a loading station L to a station M where clamping rings D and E are assembled, these rings moving respectively in the direction of the arrows 66 and 67 until they engage the dovetail tangs of the segments. Then the annulus C moves to the station N where a tubular core F is inserted and its ends are upset or staked as indicated at F' in order to secure the clamping rings to the annulus. The work then passes to station O where no operation is performed and then to station L where the work is ejected incidentally the operation of pushing a new annulus into a workholder of the disc 350. The ejected commutator is indicated at C' at station L.

Having described generally the operation performed by this machine we will now proceed to the description of the mechanism for assembling the segments in a straight row in an orderly manner.

*Feeding metal segments*

Referring to Figs. 4 to 23 the machine base 100 supports a table frame 101 which as shown in Fig. 21 has a horizontal flange 102 supporting a plate 103 to which plates 104 and 105 are attached. It will be seen that the parts 103, 104 and 105 provide a track for the segments A and B. The backs of these segments rest on the plate 103 while their dovetailed tangs a and b are located between horizontally extending flanges 104a and 105a of the plates 104 and 105, these latter flanges retaining the pieces A and B upon the plate 103.

The metal segments A descend by gravity through a chute 110 which delivers the pieces A upon the plate 103. The outlet 111 of the chute 110 is normally closed by a gate 112 which, as shown particularly in Fig. 10, is an arm of a lever 113 pivoted at 114 upon a bracket 115. The lever 113 is urged by a spring 116 shown in Figs. 23 and 24 in such direction as to close the gate 112. The spring 116 connects the lever 113 with a bracket 117. The bracket 117 provides a cam surface 118 against which the lever 113 is urged by the spring 116. The bracket 117 is caused to reciprocate in order to open the gate by a mechanism which comprises a shaft 120 which drives a cam 121 cooperating with a roller 122 carried by bifurcated rod 123 which slides in a bearing 124 carried by a bracket 125 and secured by a cap 126 attached to the bracket 125 by the screws 127. The bracket 125 is secured to a frame 128 having feet 129 secured by screws 130 to the machine base 100. The rod 123 has a reduced portion 131 received in a bore 132 provided by a rod 133 guided for horizontal sliding movement in a bore 134 provided by a frame 135 attached to the base 100. The rod 133 is urged toward the left by spring 136 within the bore 134 and retained by a screw plug 137. The rod 123 has a portion of still smaller diameter 138 received within a bore 139 of rod 133. The rod part 138 carries a cross pin 140 extending into diametrically elongated slots 141 provided by rod 133 thereby providing a lost motion connection between the rods 123 and 133. This lost-motion connection is taken up by a spring 142 contained in the recess or bore 132 and pressing against the shoulder 143 provided by the rod 123. This spring 142 tends to press the roller 122 against the cam 121 regardless of the fact that the rod 133 may not be permitted, to move itself sufficiently toward the left to allow the spring 136 to press the roller 122 against the cam 121. As will be more apparent hereafter, the function of the spring 136 is to move the rod 133 sufficiently to cause the gate 112 to open and also for the purpose of pushing an insulating segment B from its magazine chute.

Referring again to Figs. 4 and 23, the bracket 117 is located by dowels 145 and is attached by screws 146 to a block 147 fitting snugly in a recess 148 in the rod 133. The block 147 passes through an opening 150 in the frame 135 and through an opening 151 in a dovetailed shaped plate 152 which provides a guide for a slide 153 to which the bracket 117 is attached. The guide 152 is secured by dowels 154 and screws 155 to the frame 135. Therefore, it is apparent that the slide 117 is reciprocated through the following controlled cam parts: roller 122, rod 123, rod 133, block 147, slide 153, and bracket 117.

The movement of bracket 117 is such as to cause lever 113 to move sufficiently to open and close the gate member 112, as shown in Fig. 9, each time the gate 112 opens, a segment A is moved into the position A' at the entrance to the straight track. When the gate 112 closes, as shown in Fig. 10, the segment A next to the end segment is pushed back into the chute 110.

The shaft 120 is carried by a bearing 160 in frame 128, bearings 161 and 162 in a gear housing 163 secured by screws 164 to base 100, and a bearing 165 provided by a bracket 166 secured to the base 100. The shaft 120 is driven by a sprocket wheel 166 connected by a chain 167 with a sprocket wheel 168.

Referring to Fig. 47, sprocket wheel 168 is provided with clutch teeth 169 and is fixed to a shaft 170. The shaft 170 is in alignment with a pulley shaft 171 carried by bearings 172 and 173 provided by brackets 174 and 175 respectively. Between the brackets, the shaft 171 carries a pulley 176 driven by a belt 177 driven by any suitable source of power. The shaft 171 shown in Fig. 48 has splines 180 received by internal splines in a sleeve 181 having clutch teeth 182 engageable with the clutch teeth 169. The sleeve 181 has a groove 183 which receives two companion C-shaped clutch shifter members 184 and 185 located together by dowel pins 186 and confined between diametrically opposite screw pins 187 carried by the arms 188 of a yoke which is moved by a clutch shifting lever 189 pivoted at 190 upon a bracket 191 extending from the bracket 174. In Fig. 47, the clutch members 169 and 182 are disconnected and hence the power shaft is disconnected from the machine shaft 170. To connect these shafts the lever 189 is moved clockwise as viewed in Fig. 2 thereby causing the yoke arm to move toward the left into engagement with the teeth 169 of the sprocket 168. In this way the various mechanism of the machine including those driven by shaft 120 are connected by the power shaft 171.

*Feeding insulating segments*

Referring to Figs. 4 and 5, the segments B hereafter known as mica segments descend through a chute 200 the lower end of which is supported by a curved plate 201, the upper horizontal surface 202 of which is flush with the top surface to plate 103. Referring also to Fig. 11 the lowermost segment B, which is furthest to the right in Fig. 5 and uppermost in Fig. 11, will rest against a slide bar 203 which provides a partition separating the segment A in the chute 110 from the end segment B. This bar 203 is secured to an extension 204 of bracket 117. To the bar 203 is secured a thin pusher blade 205 which as shown in Figs. 12 and 13 operates to engage the dovetailed tang b of segment B and to push the segment from a position at the lower end of the chute 200 to a position adjacent the entrance of the track provided by the parts 103, 104 and 105. Since the parts 203 and 205 are attached to the bracket 117 when this bracket moves toward the right as viewed in Fig. 23 or toward the left as viewed in Fig. 4, the lever 113 is moved clockwise into the position shown in Fig. 9 to permit a bar A to move into the position A1 referred to in Fig. 1 and at the same time the blade 205 moves toward the left from the position shown in Figs. 11 and 12 to that shown in Figs. 13 and 17. In this way a metal segment A and a mica segment B are located in a group at the entrance G (shown in Fig. 17) to the track provided by members 103, 104, and 105. As the blade 205 starts moving toward the left to push the mica segment B into place the segment B is caused to strike against a latch lever 210 which is pivoted upon pin 211 attached to chute 200 and which is yieldingly urged clockwise by a spring 212 connecting lever 210 with chute 200. To limit its movement in this direction, the lever 210 carries a pin 213 which, as shown in Fig. 15, strikes against the chute 200. As the mica segment B moves toward the left as viewed in Fig. 12 or downwardly as viewed in Fig. 16, it cams the lever 210 from the position shown in Fig. 17 to the position shown in Fig. 14. As the segment B moves toward position B' in Fig. 17, it engages the lever 210 to move it into the position shown in Figs. 14 and 16; but, when the segment B has arrived at the position B', its end surface Bx will clear the projection 215 of the latch lever 210 to permit the spring 212 to move the lever 210 into the position shown in Figs. 15 and 17. Therefore, as the slide 203 and the blade 205 are moved away from the track entrance G, the segment B is prevented by the latch 210 from moving back with the blade 205.

The parts A and B having been located adjacent the track entrance G they are next pushed into the straight track provided by parts 103, 104 and 105 by a mechanism which will now be described.

*Moving the groups of segments into the straight track*

Referring to Fig. 20, the segments A and B are delivered from the respective chutes to positions upon the plate 103 such as are shown in this figure. These parts are located under a block 220 before they are moved along the tracks. The segments A and B are moved toward the right along the plates 102 by pusher 221 carrying a screw 222 providing a pivotal support for a block 223 received in a notch 224 provided by a lever 225 pivoted on a screw 226 carried by the frame 128. The lever 225 carries a pin 227 pivotally supporting a lever 228 yieldingly urged counterclockwise by a spring 229 which is received in socket 230 in the lever 225. The lever 228 carries a pin 230 received by slot 231 provided by lever 225 in order to limit the counterclockwise movement of the lever 228, as shown in Fig. 6. Lever 228 carries a roller 232 cooperating with a cam 233 provided by a cylindrical body 234 mounted on the shaft 120, as shown in Fig. 4. The cam 233 cooperates with the roller 232 in a manner such as to move the lever 225 clockwise as viewed in Fig. 4, or toward the left as viewed in Figs. 18 and 19. The cam, therefore, operates to retract the pusher 231 from the work and in so doing compresses a spring 235, as shown in Fig. 19. Spring 235 is housed in a tube 236 attached to a bracket 237 attached to the flange 102 and covered at its left hand end with a cap 238 which holds the spring 235 compressed against a shoulder 239 provided by a rod 240 which bears against a socket member 241 attached to the lever 225. When permitted to do so by the cam 233 the spring is released as shown in Fig. 18 to move the pusher 221 toward the right so as to push the group of segments A and B toward the right along the track provided by parts 103, 104 and 105. In case the segments jam in the track no harm is done as they are moved by spring pressure. In case of a jam, the lever 225 would remain stationary while the lever 228 is moved by the cam. Under these conditions the lever 228 makes a clattering noise signalling to the operator that the segments have jammed in the track. (Jamming occurs occasionally due to nonuniformity of dimensions of the segments.)

As each group of segments move toward the right away from the block 220 shown in Fig. 20, they are caused to engage a plunger 243 supported by bracket 115 as shown in Fig. 10. This plunger is urged downwardly by spring 244 shown in Fig. 10a. This plunger 243 acts to keep the segments against the end of the pusher 241 until after the segments have moved past the lower end of the plunger 243. As the groups of segments move along the track they are held in position by a plurality of leaf spring members 249, 250, 251 and 252, the latter being much the longest and carrying a weight 253. Springs 249, 250 and 251 press on spring 252. These springs supply sufficient friction to the row of segments moving along the track so as to keep them together in one continuous row.

When the row of segments contains a predetermined number of groups sufficient to form one commutator, the row is moved as a unit toward the right into the annulus forming device, which will now be described.

*Annulus-forming device*

Referring particularly to Figs. 25 to 30, the annulus forming device is an annular track which continues from the straight track provided by members 103, 104 and 105 as shown in Fig. 30. The annular track is defined by blocks 260 and 261 which are rigidly attached to the frame 101 and by a third or upper block 262 vertically slidable on pins 263 attached to blocks 260 and 261 and yieldingly urged downwardly by a spring 264 pressing downwardly upon a plate 265 attached to block 262 and pressing upwardly against a bracket 266 attached to the frame 101. The inner boundary of the annular track is defined by a shaft 267 located centrally with respect to the circular opening provided by the combined assembled blocks 260, 261 and 262, and supported by a sleeve 268 journalled in bearings 269 and 270 carried respectively by arms 271 and 272 of a bracket 273 supported by the base 100. The sleeve 268 is connected by screw 274 with a swivel joint member 275 swivelly connected to a piston rod 276 attached to a piston 277 sliding in a cylinder 278 closed by ends 279 and 280 and integral with a bracket 281 supported by a base 100. The shaft 267 is not permitted to move endwise while the sleeve 268 is moving endwise. This is accomplished by a ring 282 located between the bracket arms 271 and 272 and carrying a screw pin 283 which passes through a slot 284 provided by the sleeve 268 and into a snugly fitting recess 285 provided by the shaft 267. Thus the shaft is supported for rotary movement only.

The shaft 267 is provided with a recess 290 within which a vane 291 is pivotally supported at 292 and is urged downwardly by a spring 293 so that the free end of the vane will project into the annular track. As the row of segments is moved into the track from the position shown in Fig. 29 to that shown in Fig. 30, the bar portions of the segments are engaged by leaf spring members 300 and 301. There are two pairs of these members and each pair is mounted in a block 302. The two blocks 302 are respectively attached to the bars 104, and 105. The function of these spring members is to apply friction to the segments so that they will remain in a continuous row as they are moved along into the annular track. The function of the vane 291 is to prevent the segments from falling down along the annular track after they have passed to the left of the vertical plane intersecting the axis of the shaft 267, when moving in a counterclockwise direction.

The row of segments is pushed along the track into the annulus forming device by a conveyor comprising a chain 310 carrying a pusher lug 311 and passing around a driving sprocket 312, an idle sprocket 313 and a slack takeup sprocket 314. The plate 102 is provided with a long slot 315 for receiving the chain 310 and the plate 103 is provided with a long slot 316 for receiving the pusher lug 311. The driving sprocket 312 is mounted on a stub shaft 317 mounted in a bearing 318 carried by the frame 101. As shown in Fig. 8, shaft 317 is connected by pin 319 with a coupling 320 connected by a pin 321 with a shaft 322. Referring to Fig. 4, shaft 322 is journalled in bearings 323 and 324 provided by gear housing 163 and is connected with a worm gear 325 which meshes with a worm 326, which, as shown in Fig. 47, is pinned to the shaft 120 and is located between ball thrust bearings 327 and 328. The idle pulley 313 is mounted on a stub shaft 330 shown in Figs. 25 and 26 and is retained by washer 331 secured by screws 332. The sprocket 314 is mounted on a pin 333 carried by forks 334 and 335 of a takeup bracket 336 mounted in a frame 337 which is welded to brackets 338 and 339 attached to the frame 101. The takeup bracket 336 is yieldingly urged downwardly by a spring 340 pressing against a washer 341 secured by screw 342 to the lower end of the bracket 336.

In Fig. 18 the arrows 343 and 344 indicate the direction of movement of the conveyor chain 310 which moves in timed relation to the devices for assembling the segments in groups and for pushing these groups into the straight track. When a predetermined number of groups of segments have been assembled in a straight row on the plate 103 the pusher lug 311 moves into the position shown in Fig. 18 between consecutive operations of the pusher slide 221 and starts pushing the row of segments along the track at a greater speed than the pusher slide 221 can assemble the next group of segments in the track shown at A', B' in Fig. 19. Hence, as the lug 311 moves along the pusher slide 221 can keep on operating to push segments into the track. The operation of the lug 311 is clearly shown in Figs. 27 and 28. In Fig. 27 the row of segments is shown just entering the annular track and starting to push against the vane 291 which serves to keep these segments in a continuous annular row while they are in the annulus forming device. As the segments move along, their progress is retarded by the springs 301 and 300 described with reference to Figs. 29 and 30 so as to keep the segments together while they are moving into the annular track. As the segments move around the annular track, they are held together by the vane 291 while pushing the vane 291 in a counterclockwise direction as viewed in Figs. 27 and 28, thereby causing the shaft 267 and the sleeve 268 to turn in the same direction. The springs 300 and 301 also assist in keeping the segments against the vane 291 as shown in Fig. 28. By the time the last pair of segments A, B has been moved into the track the pusher lug 327 has cleared the bar portions of these segments and swings away from the track, as shown in Fig. 28.

These segments having been formed into an annulus C shown in the diagram of Fig. 1, they are now ready to be pushed into the workholder of the conveyor disc 350.

*Conveyor disc and operating mechanism*

The disc conveyor 350 is mounted upon a shaft 351 journalled in bearings 352 and 353 carried respectively by pedestals 354 and 355 integral with a base 356 resting on the base 100. The shaft 351 is supported in a suitable bearing provided by a bracket 357 and carries a Geneva driven gear member 358 having four slots 359 arranged at 90 degrees. Each slot 359 receives a roller 360 of a Geneva gear driving member 361 which is mounted on a shaft 362 supported at one end by the bracket 357 and journalled in bearings 363 and 364 provided by a gear housing 365 and its cover 366. The housing 365 rests on a sub-base 367 resting on base 100 and contains speed-reduction gearing, not shown, for connecting shaft 170 with shaft 362. The shaft 362 turns clockwise thereby swinging the roller 360 from a non-operating position shown by a dotted line circular in Fig. 47 to the position 360a in which it begins to drive the member 358 in a counterclockwise direction indicated by the arrow 369 in Fig. 47. For each revolution of the shaft 362 there will be a 90 degree rotation of shaft 351. The disc 350 carries four equidistant workholders, each provided by a hole defined by cylindrical surfaces 370, 371, and 372, as shown in Fig. 33. The cylindrical surface 370 receives a ring 373 having a conical hole 374 which guides the segments into the workholder and causes them to be contracted while being pushed into the workholder. The surface 372 also receives a ring 375 having a tapered portion 376 to facilitate the movement of the segments into the ring 375. The segments are yieldingly held in position within the rings 373 and 375 by half rings 377 yieldingly urged against the segments by springs 378 which are attached respectively to the half rings 377 and which bear against the surface 371. The half rings 377 are retained between the rings 373 and 375 which are press fitted into the surfaces 370 and 372 respectively. It is apparent from the diagram Fig. 1 and from Fig. 28 that the annulus C, while within the annulus-forming device is not a continuous annulus of segments; but, when the annulus has been shoved into the workholder, the segments are contracted so that the annulus of segments becomes continuous.

The annulus C is forced into the workholder by pressure fluid operated means comprising the piston 277 shown in Fig. 25 and parts associated therewith, and controlled by a valve to be described later. Pressure fluid is admitted through a pipe 1280, thereby causing the piston 277 to move toward the right from the position shown in Fig. 25 to that shown in Fig. 26, thereby causing the sleeve 268 to move from the position shown in Fig. 25 to that shown in Fig. 26. Since the end of the sleeve 268 engages the annulus C the latter is forced out of the annulus forming device into the workholder as shown in Fig. 26. The act of forcing a new annulus C into the workholder effects the ejection of a completed commutator previously completely assembled in that workholder. The ejected commutator is indicated at C' in Figs. 1 and 26. After the annulus C has been forced into the workholder the sleeve 268 is retracted by admitting pressure fluid through a pipe 1278 while permitting it to discharge from pipe 1280. This will cause the piston 277 to move again to the position shown in Fig. 25. Then, the disc conveyor is moved 90 degrees in the direction of the arrow 61 in Fig. 1 or 369 in Fig. 47, or arrow 379 in Fig. 25. During this movement the annulus C moves from the loading station L to the first work station N of Fig. 1 at which station insulated clamping rings are assembled with the annulus.

*Mechanism for assembling clamping rings with annulus*

Referring to Figs. 1, 35, 36 and 37, the clamping rings D and E which have previously been assembled with insulating rings d and e respectively, descend through chutes 380 and 381, respectively, until the bottom ones rest on blocks 382 and 383, respectively, carried by brackets 384 and 385, respectively, attached to pedestals 354 and 355, respectively. The brackets 384 and 385 provide guides for horizontally slidable plungers 386 and 387, respectively, attached by rods 388 and 389, respectively, to pistons 390 and 391, respectively, cooperating with cylinders 392 and 393, respectively, integral with brackets 394 and 395, respectively, attached to brackets 384 and 385, respectively. The cylinder frames or brackets 394 and 395 are tied together for the purpose of reenforcement by tie rods 396 and 397. Cylinders 392 and 393 are closed at their outer ends by plates 398 and 399, respectively, tapped to receive pipes 1398 and 1399, respectively. The inner ends of the cylinders are closed by plates 400 and 401, respectively, providing stuffing boxes for receiving the rods 388 and 389 respectively. Pressure fluid is admitted to the inner ends of these cylinders by pipes 1392 and 1393 respectively. When pressure fluid is admitted through pipes 1392 and 1393 the pistons 390 and 391 are moved apart into the position shown in Fig. 36 whereupon the pairs of rings D,d and E,e may descend through the chutes 380 and 381, respectively, and rest upon the blocks 382 and 383, respectively. At the proper time when a new annulus C has been moved by the conveyor 350 into alignment with the plungers 386 and 387, pressure fluid is admitted through pipes 1398 and 1399 while being released through pipes 1392 and 1393 thereby causing the pistons 390 and 391 to move inwardly to move the pairs of rings D,d and E,e into assembled relation with respect to the annulus C. Then the pistons 390 and 391 are moved apart again so that the assembled annulus and insulated clamping rings can be moved further in the direction of the arrow 61 of Fig. 1 into the work station N, at which station means are assembled and secured in place for binding the annulus of segments between the insulated clamping rings.

*Means for assembling and staking the tubular core*

Referring to Figs. 37 to 46 inclusive, and particularly to Fig. 38, when the annulus C has been moved by the conveyor disc 350 into the work station N shown in Figs. 1 and 38, the annulus and the rings D and E assembled therewith will be located in alignment with the lowermost of the tubular cores F which descend through a chute 410 and rest upon a bracket 411 secured by screws 412 to base 100.

The core F is pushed into the annulus C by means comprising a pressure cylinder 413 cooperating with a piston 414 carrying a piston rod 415. The cylinder 413 is closed by end wall members 416 and 417 secured together by tie rods 418 and nuts 419. The end frames 416 and 417 are bolted to a bracket 420 attached to the base 100. Fig. 2 shows one of the bolts 416a passing through an ear 416b of frame 416. A pipe 1416 conducts pressure fluid to the left end of the cylinder 413 and a pipe 1417 conducts pressure fluid to the right end of the cylinder. Rod 415 passes through a packing gland 421 and is connected by pin 422 to a push rod 423. As shown more clearly in Fig. 43, push rod 423 is connected by pin 424 to a bar 425 having holes 426 through which rods 427 are relatively slidable. Rods 427 are attached to a clamp or pressure block 428 urged toward the left by spring 429 surrounding the rod 423 and confined between the block 428 and the bar 425. Separation of block 428 from bar 425 is limited by nuts 430 adjustably carried by the rods 427 and engageable with the bar 425. The clamp block 428 slides horizontally in a way provided by guide blocks 431 carried by the bracket 411. The guide blocks 431 support the chute 410 and the clamp block 428 is of general U-shape, the parallel legs of which support the lowermost core in the chute 410 (see Figs. 45 and 46) and guide the same into the annulus C as shown in Fig. 43. The rod 423 extends between the parallel legs of clamp block 428 and the latter is also provided with two pressure pads 428a engageable with the clamping ring E assembled with the annulus C in Fig. 43.

While the V-ring E is being urged toward the left as viewed in Fig. 43, the ring D is urged toward the right in order to firmly hold the annulus of segment C by means which comprise a pressure cylinder 433 cooperating with a piston 434 connected with a rod 435. The ends of the cylinder 433 are closed by end frames 436 and 437 tied together by bolts 438 and nuts 439. The frames 436 and 437 are secured to a frame 440 attached to the base 100 by providing the end frames with horizontally extending ears 441 (see Fig. 38) by which the end frame may be supported upon the base frame. Screws 442 passing through ears 441 of frame 437 (at left in Fig. 38) secure this frame to the base frame 440. Pipes 1436 and 1437 conduct pressure fluid to the right and left hand ends of the cylinder 433 respectively. The cylinder base frames 440 and 420 are tied together by a tie rod 445 having a threaded portion 446 at each end adapted to receive nuts 447.

The piston rod 435 slides through a packing gland 450 and is attached by pin 451 to a sleeve 452 slidable in a bearing 453 provided by an arm of bracket 354 as shown also in Fig. 37. The bearing 453 is retained by a cap 454 attached by screws 455. The sleeve 452 is provided with an annular pressure flange 456 which, as shown particularly in Fig. 43, bears against the V-ring D.

Before the tubular core F is pushed within the annulus C, the clamping members 428a and 456 are caused to exert pressure against the rings E and D. This is accomplished by admitting pressure fluid through pipes 1417 and 1437 while releasing the pressure through pipes 1416 and 1436. After motion of the pressure block 428 has been arrested, the rod 423 continues still further to move toward the left while compressing the spring 429. During this further movement, a crimping block 460, which is attached by pin 461 to rod 423, engages the lowermost tube F as shown in Fig. 39 and pushes the same from the position shown in Figs. 39 and 42 to that shown in Figs. 40 and 43. The tube F is moved through the annulus and rings until its left hand end strikes a crimping bar 465 carried by a pilot block 466 carried by the sleeve 452. After the left end of the tubular core F strikes the bar 465 further movement of the rod 423 toward the left causes portions of the ends of the tube F to be deformed as indicated at F' in Fig. 1. The deformation is caused by forcing the hard metal rib 462 of the block 460 into the right hand end of the core F while the left hand end is being forced against the hard metal deforming bar 465. In this way the clamping rings D and E are permanently attached to the annulus C while the rings are being clamped under yielding pressure against the dove tail shaped tangs of the segments of the annulus C.

Following the tube assembling and staking operation the members 462 and 428a on the right hand side of the annulus and the members 465, 466 and 456 on the left hand side are retracted by causing pressure fluid to be admitted through the pipes 1416 and 1436 while relieving pressure through the pipes 1416 and 1437. For best results the staking tools 462 and 465 should be maintained in the same plane. This is accomplished by preventing the rods 423 and 435 from turning. Rod 423 is prevented from turning since it is pinned to the bar 425 which cannot turn by reason of connection of the bar 425 with the block 428 which is non-rotatably supported by the bracket 411. The rod 435 cannot turn since it is clamped by screws 470 between bars 471 (see Fig. 41); and the bars 471 loosely embrace the rod 435.

Following the staking operation performed at station N the work progresses to station O and then to L where it is ejected from the conveyor 350 due to pushing into the conveyor a new annulus C.

Pressure controlling valve

Referring to Figs. 49 and 3, the machine base 100 supports in any suitable manner, a valve 480 comprising a block 481 having a central bore interrupted by annular chambers 482, 483 and 484 so as to provide interrupted cylindrical surfaces 485, 486, 487 and 488, which cooperate with a slide valve 489 having valve portions 490 and 491. The valve portion 490 cooperates with surfaces 485 and 486 and the valve portion 491 cooperates with surfaces 487 and 488. The valve 489 is connected with a rod 492 which passes through a packing gland 493 attached to an end cover and frame member 494 secured to the valve block 481. The member 494 provides guides for a horizontally slidable block 495 attached to the rod 492 and carrying a roller 496 cooperating with a cam 497 attached to the shaft 362. The roller 496 is urged against the cam 497 by a spring 498 confined between the valve member 489 and an end plate 499 attached to the valve body 481. Pressure fluid is admitted to the annular chamber 483 through a pipe 500. When the valve 489 is in the position shown in Fig. 49, the fluid under pressure can flow in the direction of the arrow 501 through bore 486 into chamber 482 and thence through pipe 502 which is attached to a block 503 fastened to the valve body 481. Pipe 502 is connected with pipes 1416 and 1393 on one side of the conveyor disc 350 and with pipes 1436, 1392 and 1278 on the opposite side of the conveyor thereby causing the pistons 414, 391, 433, 390 and 277 to move away from the conveyor, the direction of pressure being indicated by arrows 413a in cylinder 413, 393a in cylinder 393, 433a in cylinder 433, 392a in cylinder 392 and arrows 278a in cylinder 278. During movement of the pistons away from the conveyor disc, the pressure in the ends of the cylinders remote from the conveyor is relieved by connecting these ends of the cylinders with an exhaust passage or a low pressure side of the pressure fluid line. This is accomplished by connecting pipes 1417, 1399, 1437, 1398 and 1280 with a pipe 505 which is connected to a block 506 attached to the valve body 481. Arrows 507 and 508 indicate the flow of pressure fluid from the pipe 505 through the annular chamber 484, the bore 488, and through an exhaust duct 509 which connects both bores 485 and 488 and which communicates with an exhaust pipe 510 attached to a block 511 fastened to the valve body 481 and providing a cover for the duct 509. When the cam 497 turns so that its low point 497a is engaged by the roller 496, the valve 489 will be in a position wherein the passage 483 will be blocked from the passage 482 by reason of the location of the valve part 490 within the bore 486. At the same time the chamber 483 will be placed in communication with the chamber 484 and the latter will be blocked from the exhaust passage 509 by reason of the location of the valve part 491 within the bore 488. When this occurs the high pressure line 500 will be placed in communication with the pipe 505 and the pipe 502 will be placed in communication with the exhaust pipe 510. Then the pressure in the cylinders will be reversed to cause the pistons to move toward the work in order to perform the various operations which have been described.

Résumé of operations

The sequence of operations of the machine will now be described briefly with respect to the cam chart shown in Fig. 50. All of the operations have been based upon one revolution of the shaft 362. Since the commutator comprises an annulus of 28 groups of segments, each group comprising one metallic bar A and one mica segment B, it is evident that during one cycle or revolution of shaft 362 there must be 28 reciprocations of the gate 112 and the mica segment pusher 203 in order to move 28 groups of bars into the position shown at A'B' in Fig. 1. In Fig. 50, the curve I indicates reciprocations of parts 112 and 203 for this purpose. Accompanying the 28 reciprocations referred to, there must be 28 reciprocations of the pusher 221 which pushes the group of parts AB into the straight track. The curve II indicates the movements of the pusher 221. When the bars have been assembled in the row R in the straight track they are pushed by the lug 311 into the annulus forming device as indicated by arrows 64 in Fig. 1. Diagram III including lines a—b—c—d—e—a represents the movement of the conveyor. The line e—a—b represents operation of the conveyor chain lug 311 to push the segments from the straight track into the annular track. The line c—d represents the idle period of the conveyor.

Diagram IV comprising lines f—g—h—f represents the movement of the conveyor disc. The line h—f from 90 to 360 degrees represents no motion and the line f—g—h from 0 to 90 degrees represents movement of the conveyor disc by the Geneva gear movement. It will be noted that the conveyor moves while the segments are being conveyed into the annulus forming device and that the conveyor is at rest during operating periods of mechanisms whose functions are represented by the following diagrams.

Diagram V comprising lines i—j—k—l—m—i represents movement of the valve 489 which controls the pressure fluid as explained with reference to Fig. 49. As soon as the conveyor disc 350 comes to rest cam 497 moves its low portion 497a adjacent the roller 486 to permit movement of the valve 489, under the action of spring 498 toward the right from the position shown in Fig. 49. This movement of valve 489 is represented by line j—k. At the end of such movement pressure fluid is fully admitted through pipe 505 thereby causing the pistons to approach the work. Line k—l represents the idle period of the valve 489 in its right hand position. Line l—m represents movement of the valve 489 from its right hand position into the left hand position shown in Fig. 49 thereby causing the pistons to be retracted from the work. Line m—i—j represents the idle period of the valve 489 in its left hand position.

Diagram VI comprising lines n—o—p—q—r—n represents movements of the piston 277 shown in Figs. 25 and 26. The line o—p represents movement of the piston 277 toward the work. Line p—q represents the idle period during which the annulus pushing sleeve 268 remains in the position shown in Fig. 26. Line q—r represents movement of the piston 277 away from the work. Line r—n—o represents the idle period of the piston 277 while in the position shown in Fig. 25.

Diagram VII comprising lines s—t—u—v—w—s represents movements of the pistons 390 and 391 for assembling the V-rings D and E by movements thereof in the direction of arrows 66 and 67 respectively as shown in Fig. 1. Line t—u represents movement of the piston 390 and hence of the rings D and E toward the work. Line u—v represents the idle position of these pistons when nearest the work. Line v—w represents retraction of the pistons from the work. Line w—s—t represents the idle period of the pistons when retracted from the work as shown in Fig. 36.

Diagram VIII comprising lines x—y—z—aa—bb—x represents movement of the left hand piston 434 and hence of the sleeve 452 relative to the work. Line y—z represents movement of the sleeve 452 toward the work from the position shown in Fig. 38 to that shown in Fig. 39. Line aa—bb represents movement of the sleeve 452 away from the work. Diagram IX comprising line cc—dd—ee—ff—gg—cc represents movement of the right hand piston 414 toward the work. The line dd—ee represents movement of the piston 414 toward the left, and line ff—gg represents movement toward the right. It will be noted that line dd—ee parallels line y—z of diagram VIII and line ff—gg parallels line aa—bb, and that point dd is vertically below point y and that point ff is vertically below point aa. This represents that pistons 414 and 434 begin to move toward the work at the same time and begin to move away from the work at the same time. Since line dd—ee is longer than line y—z and line ff—gg is longer than line aa—bb this indicates that the piston 414 has a longer travel than the piston 434. The line dd—ee contains a point z' below point z of diagram VIII. That portion of the movement of piston 414 toward the work represented by the line dd—z', is a movement of the pressure pads 428a from the position shown in Fig. 38 to that shown in Fig. 39 which movement is sufficient to cause the ring E to be pressed inwardly toward the annulus C just as the annular pressure flange 456 begins to press the ring D in the opposite direction. The line z'—ee represents movement of the piston 414 after movement of the piston 434 ceases. During this additional movement, the rod 423 continues to move after movement of the pressure block 428 ceases. During this further movement of rod 423 the spring 429 is compressed to increase the clamping pressure applied to the rings D and E by the pressure pads 428a thereby forcing the annulus and rings toward the left against the pressure flange 456 of the sleeve 452. Also during the movement represented by the line z'—ee a core F is moved from the position shown in Figs. 39 and 42 to the position shown in Figs. 40 and 43. Just at the end of the movement of the rod 423 toward the left the crimping of the ends c. the core F by the tools 462 and 465 occur as indicated by the line hh—kk of the diagram X.

It is therefore apparent that the present machine provides for automatically assembling a commutator comprising an annulus of metallic segments alternating with insulating segments, the segments having tangs which are clamped between insulated clamping rings retained in position by a tubular core which has its end portions deformed against the clamping ring.

While the form of embodiment of the present invention as herein disclosed constitutes a preferred form, it is to be understood that other forms might be adopted, all coming within the scope of the claims which follow.

What is claimed is as follows:

1. A commutator assembling machine comprising, in combination, means for assembling an annulus of segments of metal alternating with segments of insulation, said segments having anchoring tangs and means for assembling and securing therewith devices for binding the tangs of the segments together.

2. A commutator assembling machine comprising, in combination, means for assembling an annulus of segments of metal alternating with segments of insulation, said segments having anchoring tangs, means for assembling clamping rings with the tangs of an annulus of segments, and means for attaching the clamping rings to the tangs of the segments.

3. A commutator assembling machine comprising, in combination, means for assembling an annulus of segments of metal alternating with segments of insulation, said segments having anchoring tangs, means for assembling clamping rings with the tangs of an annulus of segments, means for inserting a tubular core within the annulus and clamping rings, and means for upsetting the ends of the core to secure the rings to the tangs of the segments.

4. A commutator assembling machine comprising, in combination, means for assembling an annulus of segments, a conveyor having a plurality of workholders, means for transferring the annulus to a workholder, means for intermittently moving the conveyor, and means located at stations of the conveyor for assembling and securing devices for binding the segments together.

5. A commutator assembling machine comprising, in combination, means for assembling an annulus of segments, a conveyor having a plurality of workholders, means for transferring the annulus to a work holder, means for intermittently moving the conveyor, and means located at a station of the conveyor for attaching clamping rings to the segments.

6. A commutator assembling machine comprising, in combination, means for assembling an annulus of segments, a conveyor having a plurality of workholders, means for transferring the annulus to a workholder, means for intermittently moving the conveyor, means located at a station of the conveyor for assembling clamping rings with the annulus of segments, and means located at a second station of the conveyor for attaching the clamping rings to the annulus.

7. A commutator assembling machine comprising, in combination, means for assembling an annulus of segments, a conveyor having a plurality of workholders, means for transferring the annulus to a workholder, means for intermittently moving the conveyor, means located at a station of the conveyor for assembling clamping rings with the annulus of segments, and means located at a second station of the conveyor for inserting a tubular core within the annulus and clamping rings and for upsetting the ends of the core to secure the rings in position.

8. A commutator assembling machine comprising, in combination, means for assembling an annulus of segments, a disc conveyor having a plurality of annulus receiving recesses, resilient means in each recess for embracing an annulus, the axes of the recess being parallel to the axis of the conveyor, which axis is parallel to the axis of the annulus as formed, means for transferring the annulus to a workholder, means for intermittently moving the conveyor, and means located at stations of the conveyor for assembling and securing devices for binding the segments together.

9. A commutator assembling machine comprising, in combination, means for assembling an annulus of segments, a disc conveyor having a plurality of annulus receiving recesses, resilient means in each recess for embracing an annulus, the axes of the recess being parallel to the axis of the conveyor, which axis is parallel to the axis of the annulus as formed, means for transferring the annulus to a workholder, means for intermittently moving the conveyor, and means located at a station of the conveyor for attaching clamping rings to the segments.

10. A commutator assembling machine comprising, in combination, means for assembling an annulus of segments, a disc conveyor having a plurality of annulus receiving recesses, resilient means in each recess for embracing an annulus, the axes of the recess being parallel to the axis of the conveyor, which axis is parallel to the axis of the annulus as formed, means for transferring the annulus to a workholder, means for intermittently moving the conveyor, means located at a station of the conveyor for assembling clamping rings with the annulus of segments, and means located at a second station, of the conveyor for attaching the clamping rings to the annulus.

11. A commutator assembling machine comprising, in combination, means for assembling an annulus of segments, a disc conveyor having a plurality of annulus receiving recesses, resilient means in each recess for embracing an annulus, the axes of the recess being parallel to the axis of the conveyor, which axis is parallel to the axis of the annulus as formed, means located at a station of the conveyor for assembling clamping rings with the annulus of segments, and means located at a second station of the conveyor for inserting a tubular core within the annulus and clamping rings and for upsetting the ends of the core to secure the rings in position.

12. In a commutator assembling machine, the combination which comprises a conveyor having a plurality of workholders each workholder adapted to receive an annulus of commutator segments having anchoring tangs, means for intermittently moving the conveyor, and means located at stations of the conveyor for assembling and securing devices for binding the tangs of the segments together.

13. In a commutator assembling machine, the combination which comprises, a conveyor having a plurality of workholders, each workholder adapted to receive an annulus of commutator segments having anchoring tangs, means for intermittently moving the conveyor, means located at a station of the conveyor for assembling clamping rings with the tangs of an annulus of segments, and means located at a second station of the conveyor for attaching the clamping rings to the tangs of the segments.

14. In a commutator assembling machine, the combination which comprises, a conveyor having a plurality of workholders, each workholder adapted to receive endwise an annulus of commutator segments, means for intermittently moving the conveyor, means located at a station of the conveyor for assembling clamping rings with the annulus of segments, and means located at a second station of the conveyor for inserting a tubular core within the annulus and clamping rings and for upsetting the ends of the core to secure the rings in position.

15. In a commutator assembling machine, the combination which comprises, a disc conveyor having a plurality of holes each adapted to receive endwise an annulus of commutator segments, resilient means in each hole for embracing an annulus, the axes of the holes being parallel to the axis of the conveyor, means for intermittently rotating the conveyor, and means located at stations of the conveyor for assembling and securing devices for binding the segments together.

16. In a commutator assembling machine, the combination which comprises, a disc conveyor having a plurality of holes each adapted to receive endwise an annulus of commutator segments, resilient means in each hole for embracing an annulus, the axes of the holes being parallel to the axis of the conveyor, means for intermittently rotating the conveyor, and means located at a station of the conveyor for attaching clamping rings to the segments.

17. In a commutator assembling machine, the combination which comprises, a disc conveyor having a plurality of holes each adapted to receive endwise an annulus of commutator segments, resilient means in each hole for embracing an annulus, the axes of the holes being parallel to the axis of the conveyor, means for intermittently rotating the conveyor, means located at a station of the conveyor for assembling clamping rings with the annulus of segments, and means located at a second station of the conveyor for attaching the clamping rings to the annulus.

18. In a commutator assembling machine, the combination which comprises a disc conveyor having a plurality of holes each adapted to receive endwise an annulus of commutator segments, resilient means in each hole for embracing an annulus, the axes of the holes being parallel to the axis of the conveyor, means for intermittently rotating the conveyor, means located at a station of the conveyor for assembling clamping rings with the annulus of segments, and means located at a second station of the conveyor for inserting a tubular core within the annulus and clamping rings and for upsetting the ends of the core to secure the rings in position.

19. A commutator assembling machine comprising, in combination, means for assembling an annulus of segments of metal alternating with segments of insulation, said segments having anchoring tangs, and means actuated in timed relation with the operation of the assembling means for attaching clamping rings to the tangs of the segments.

20. A commutator assembling machine comprising, in combination, means for assembling an annulus of segments of metal alternating with segments of insulation, said segments having anchoring tangs, means for assembling clamping rings with the tangs of an annulus of segments, and means actuated in timed relation with operation of the clamping ring assembling means for attaching the clamping rings to the tangs of the segments.

21. A commutator assembling machine comprising, in combination, means for assembling an annulus of segments of metal alternating with segments of insulation, said segments having anchoring tangs, means actuated in timed relation with the operation of said assembling means for assembling clamping rings with the tangs of an annulus of segments, and means actuated in timed relation with the operation of the clamping ring assembling means for attaching the clamping rings to the tangs of the segments.

22. A commutator assembling machine comprising, in combination, means for assembling an annulus of segments of metal alternating with segments of insulation, said segments having anchoring tangs, means for assembling clamping rings with the tangs of an annulus of segments, and means for inserting a tubular core within the annulus and clamping rings and for upsetting the ends of the core to secure the rings to the tangs of the segments.

23. A commutator assembling machine comprising, in combination, means for assembling an annulus of segments of metal alternating with segments of insulation, said segments having anchoring tangs, means for assembling clamping rings with the tangs of an annulus of segments, and means actuated in timed relation with the operation of the clamping ring assembling means for inserting a tubular core within the annulus and clamping rings and for upsetting the ends of the core to secure the rings to the tangs of the segments.

24. A commutator assembling machine comprising, in combination, means for assembling an annulus of segments of metal alternating with segments of insulation, said segments having anchoring tangs, means actuated in timed relation with the operation of said assembling means for assembling clamping rings with the tangs of an annulus of segments, means also actuated in timed relation with the operation of the first mentioned assembling means for inserting a tubular core within the annulus and clamping rings, and means also actuated in timed relation with the operation of the first mentioned assembling means for upsetting the ends of the core to secure the rings to the tangs of the segments.

25. A commutator assembling machine comprising, in combination, means for assembling an annulus of segments, a conveyor having a plurality of workholders, means for transferring the annulus to a workholder, means actuated in timed relation with the operation of the annulus transferring means for intermittently moving the conveyor, and means located at stations of the conveyor for assembling and securing devices for binding the segments together.

26. A commutator assembling machine comprising, in combination, means for assembling an annulus of segments, a conveyor having a plurality of workholders, means actuated in timed relation with the operation of the assembling means for transferring the annulus to a workholder, means for intermittently moving the conveyor, and means located at stations of the conveyor for assembling and securing devices for binding the segments together.

27. A commutator assembling machine comprising, in combination, means for assembling an annulus of segments, a conveyor having a plurality of workholders, means actuated in timed relation with the operation of the assembling means for transferring the annulus to a workholder, means actuated in timed relation with the operation of the transferring means for intermittently moving the conveyor, and means located at stations of the conveyor for assembling and securing devices for binding the segments together.

28. A commutator assembling machine comprising, in combination, means for assembling an annulus of segments, a conveyor having a plurality of workholders, means for transferring the annulus to a workholder, means for intermittently moving the conveyor, and means located at stations of the conveyor and actuated in timed relationship with the operation of said assembling means for assembling and securing devices for binding the segments together.

29. A commutator assembling machine comprising, in combination, means for assembling an annulus of segments, a conveyor having a plurality of workholders, means for transferring the annulus to a workholder, means for intermittently moving the conveyor, and means located at stations of the conveyor and actuated in timed relation with the operation of the intermittent moving means for assembling and securing devices for binding the segments together.

30. A commutator assembling machine comprising, in combination, means for assembling an annulus of segments, a conveyor having a plurality of workholders, means for transferring the annulus to a workholder, means actuated in timed relation with the operation of the transferring means for intermittently moving the conveyor, and means located at stations of the conveyor and actuated in timed relation with the operation of the intermittent moving means for assembling and securing devices for binding the segments together.

31. A commutator assembling machine, comprising, in combination, means for assembling an annulus of segments, a conveyor having a plurality of workholders, means actuated in timed relation with the operation of the assembling means for transferring the annulus to a workholder, means actuated in timed relation with the operation of the transferring means for intermittently moving the conveyor, and means located at stations of the conveyor and actuated in timed relation with the operation of the assembling means for assembling and securing devices for binding the segments together.

32. A commutator assembling machine, comprising, in combination, means for assembling an annulus of segments, a conveyor having a plurality of workholders, means for transferring the annulus to a workholder, means for intermittently moving the conveyor, and means located at a station of the conveyor and actuated in timed relation with the operation of the intermittent moving means for attaching clamping rings to the segments.

33. A commutator assembling machine, comprising, in combination, means for assembling an annulus of segments, a conveyor having a plurality of workholders, means for transferring the annulus to a workholder, means for intermittently moving the conveyor, means located at a station of the conveyor for assembling clamping rings with the annulus of segments, and means located at a second station of the conveyor and actuated in timed relation with the operation of the clamping ring assembling means for attaching the clamping rings to the annulus.

34. A commutator assembling machine comprising, in combination, means for assembling an annulus of segments, a conveyor having a plurality of workholders, means for transferring the annulus to a workholder, means for intermittently moving the conveyor, means actuated in timed relation with the operation of the intermittent moving means and located at a station of the conveyor for assembling clamping rings with the annulus of segments, and means actuated in timed relation with the operation of the clamping ring assembling means and located at a second station of the conveyor for attaching the clamping rings to the annulus.

35. A commutator assembling machine comprising, in combination, means for assembling an annulus of segments, a conveyor having a plurality of workholders, means for transferring the annulus to a workholder, means for intermittently moving the conveyor, means located at a station of the conveyor for assembling clamping rings with the annulus of segments, and means located at a second station of the conveyor and actuated in timed relation with the operation of the clamping ring assembling means for inserting a tubular core within the annulus and clamping rings and for upsetting the ends of the core to secure the rings in position.

36. A commutator assembling machine comprising, in combination, means for assembling an annulus of segments, a conveyor having a plurality of workholders, means for transferring the annulus to a workholder, means for intermittently moving the conveyor, means located at a station of the conveyor and actuated in timed relation with the operation of the intermittent moving means for assembling clamping rings with the annulus of segments, and means located at a second station of the conveyor and actuated in timed relation with the operation of the clamping ring assembling means for inserting a tubular core within the annulus and clamping rings and for upsetting the ends of the core to secure the rings in position.

37. In a commutator assembling machine, the combination which comprises a conveyor having a plurality of workholders each workholder adapted to receive an annulus of commutator segments of metal alternating with segments of insulation, said segments having anchoring tangs, means for intermittently moving the conveyor, and means located at a station of the conveyor and actuated in timed relation with the operation of the intermittent moving means for attaching clamping rings to the tangs of the segments.

38. In a commutator assembling machine, the combination which comprises, a conveyor having a plurality of workholders, each workholder adapted to receive an annulus of commutator segments of metal alternating with segments of insulation, said segments having anchoring tangs, means for intermittently moving the conveyor, means located at a station of the conveyor for assembling clamping rings with the annulus of segments, and means located at a second station of the conveyor and actuated in timed relation with the operation of the clamping ring assembling means for attaching the clamping rings to the tangs of the annulus.

39. In a commutator assembling machine, the combination which comprises, a conveyor having a plurality of workholders, each workholder adapted to receive an annulus of commutator segments of metal alternating with segments of insulation, said segments having anchoring tangs, means for intermittently moving the conveyor, means located at a station of the conveyor and actuated in timed relation with the operation of the intermittent moving means for assembling clamping rings with the annulus of segments and means located at a second station of the conveyor and actuated in timed relation with the operation of the clamping ring assembling means for attaching the clamping rings to the tangs of the annulus.

40. In a commutator assembling machine, the combination which comprises, a conveyor having a plurality of workholders, each workholder being adapted to receive endwise an annulus of commutator segments, means for intermittently moving the conveyor, means located at a station of the conveyor for assembling clamping rings with the annulus of segments, and means located at a second station of the conveyor and actuated in timed relation with the operation of the clamping ring assembling means for inserting a tubular core within the annulus and clamping rings and for upsetting the ends of the core to secure the rings in position.

41. In a commutator assembling machine, the combination which comprises, a conveyor having a plurality of workholders, each workholder being adapted to receive endwise an annulus of commutator segments, means for intermittently moving the conveyor, means located at a station of the conveyor and actuated in timed relation with the operation of the intermittent moving means for assembling clamping rings with the annulus of segments, and means located at a second station of the conveyor and actuated in timed relation with the operation of the clamping ring assembling means for inserting a tubular core within the annulus and clamping rings and for upsetting the ends of the core to secure the rings in position.

42. In a commutator assembling machine, the combination which comprises, a conveyor having a plurality of workholders, each workholder being adapted to receive endwise an annulus of commutator segments, means for intermittently moving the conveyor, means located at a station of the conveyor and actuated in timed relation with the operation of the intermittent moving means for assembling clamping rings with the annulus of segments, means located at a second station of the conveyor and actuated in timed relation with the operation of the clamping ring assembling means for inserting a tubular core within the annulus and clamping rings, and means located at a station of the conveyor other than the clamping ring assembling station for upsetting the ends of the core to secure the rings in position.

43. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; chutes containing clamping rings leading to another station of the conveyor; fluid pressure operated means for moving the lowermost clamping rings in the chutes into proper assembling position with an annulus, and means for controlling the operation of the fluid pressure operated means.

44. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; chutes containing clamping rings leading to another station of the conveyor; fluid pressure operated means for moving the lowermost clamping rings in the chutes into proper assembling position with an annulus; and means actuated in timed relation with the operation of the intermittent moving means for controlling the operation of the fluid pressure operated means.

45. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; chutes containing clamping rings leading to another station of the conveyor; fluid pressure operated means for moving the lowermost clamping rings in the chute into proper assembling position with an annulus; a chute containing tubular cores and leading to a third station of the conveyor; fluid pressure operated means for moving the lowermost core in the chute into an annulus and its clamping rings and for upsetting the ends of the core to secure the rings in position; and means for controlling the operations of all fluid pressure operated means.

46. A commutator assembling machine comprising in combination, means for assembling an annulus of segments; a conveyor having a plurality of workholders; means for transferring an annulus of segments from the assembling means to a workholder at a certain station of the conveyor; means for intermittently moving the conveyor; chutes containing clamping rings leading to another station of the conveyor; fluid pressure operated means for moving the lowermost clamping rings in the chutes into proper assembling position with an annulus; a chute containing tubular cores and leading to a third station of the conveyor; fluid pressure operated means for moving the lowermost core in the chute into an annulus and its clamping rings and for upsetting the ends of the core to secure the rings in position; and means actuated in timed relation with the operation of the intermittent moving means for controlling the operations of all fluid pressure operated means.

47. A commutator assembling machine comprising, in combination, means for assembling an annulus of segments; a conveyor having a plurality of workholders; means for simultaneously transferring an annulus from the assembling means to a workholder at a certain station of the conveyor and for ejecting a commutator therefrom; means for intermittently moving the conveyor; and means located at stations of the conveyor for assembling and securing devices for binding the segments of an annulus together before reaching the ejecting station.

48. A commutator assembling machine comprising, in combination, means for assembling an annulus of segments; a conveyor having a plurality of workholders; fluid pressure operated means for simultaneously transferring an annulus from the assembling means to a workholder at a certain station of the conveyor and for ejecting a commutator therefrom; means for controlling the operation of said fluid pressure operated means; means actuated in timed relation with the operation of said transferring and ejecting means for intermittently moving the conveyor; and means located at stations of the conveyor for assembling and securing devices for binding the segments of an annulus together before reaching the ejecting station.

49. A commutator assembling machine comprising, in combination, means for assembling an annulus of segments; a conveyor having a plurality of workholders; fluid pressure operated means for simultaneously transferring an annulus from the assembling means to a workholder at a certain station of the conveyor and for ejecting a commutator therefrom; means for intermittently moving the conveyor; chutes containing clamping rings leading to another station of the conveyor; fluid pressure operated means for moving the lowermost clamping rings in the chutes into proper assembling position with an annulus; a chute containing tubular cores and leading to a third station of the conveyor; fluid pressure operated means for moving the lowermost core in the chute into an annulus and its clamping rings and for upsetting the ends of the core to secure the rings in position; and means for controlling the operations of all fluid pressure operated means.

50. A commutator assembling machine comprising, in combination, means for assembling an annulus of segments; a conveyor having a plurality of workholders; fluid pressure operated means for simultaneously transferring an annulus from the assembling means to a workholder at a certain station of the conveyor and for ejecting a commutator therefrom; means for intermittently moving the conveyor; chutes containing clamping rings leading to another station of the conveyor; fluid pressure operated means for moving the lowermost clamping rings in the chute into proper assembling position with an annulus; a chute containing tubular cores and leading to a third station of the conveyor; fluid pressure operated means for moving the lowermost core in the chute into an annulus and its clamping rings and for upsetting the ends of the core to secure the rings in position; and means actuated in timed relation with the operation of the conveyor moving means for controlling the operations of all fluid pressure operated means.

51. In a commutator assembling machine, the combination of a conveyor having a plurality of workholders, each workholder being adapted to receive endwise an annulus of commutator segments; means for intermittently moving the conveyor; means located at a station of the conveyor for assembling clamping rings with the annulus of segments; means located at another station of the conveyor for inserting a tubular core within the annulus and clamping rings; and means located at a station of the conveyor other than the ring assembling station for upsetting the ends of the core to secure the rings in position.

52. A commutator assembling machine comprising, in combination, means for assembling an annulus of segments; a conveyor having a plurality of workholders; means for transferring the annulus endwise to a workholder; means for intermittently moving the conveyor; means located at a station of the conveyor for assembling clamping rings with the annulus of segments; means located at another station of the conveyor and actuated in timed relationship with the operation of the clamping ring assembling means for inserting a tubular core within the annulus and clamping rings; and means located at the core inserting station of the conveyor for upsetting the ends of the core to secure the rings in position.

53. A commuator assembling machine comprising in combination, means for assembling an annulus of segments; a conveyor having a plurality of workholders; means for transferring an annulus of segments from the assembling means to a workholder at a certain station of the conveyor; means for intermittently moving the conveyor; chutes located on opposite sides of an annulus in a workholder of the conveyor and containing a supply of clamping rings, the lowermost rings in the chutes being in axial alignment with an annulus of segments at another station of the conveyor; and means for simultaneously moving the lowermost clamping rings in the chutes into clamping engagement with the aligned annulus of segments.

54. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; means for supplying clamping rings to the annulus of segments at another station of the conveyor; a chute containing tubular cores, the lowermost core in the chute being in axial alignment with an annulus of segments and clamping rings at still another station of the conveyor; means for moving the lowermost core in the chute into an aligned annulus and its clamping rings; and means located at a conveyor station other than the transfer station or the ring assembling station for upsetting the ends of the core to secure the rings in position.

55. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; means for supplying clamping rings to the annulus of segments at another station of the conveyor; a chute containing tubular cores, the lowermost core in the chute being in axial alignment with an annulus of segments and clamping rings at still another station of the conveyor; and means for moving the lowermost core in the chute into an aligned annulus and its clamping rings and for upsetting the ends of the core to secure the rings in position.

56. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; means for supplying clamping rings to the annulus of segments at another station of the conveyor; a chute containing tubular cores, the lowermost core in the chute being in axial alignment with an annulus of segments and clamping rings at still another station of the conveyor; means for moving the lowermost core in the chute into an aligned annulus and its clamping rings; and means located at the core receiving station of the conveyor for upsetting the ends of the core to secure the rings in position.

57. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; means actuated in timed relationship with the operation of the intermittent moving means for supplying clamping rings to the annulus of segments at another station of the conveyor; a chute containing tubular cores, the lowermost core in the chute being in axial alignment with an annulus of segments and clamping rings at still another station of the conveyor; and means actuated in timed relationship with the ring supplying means for moving the lowermost core in the chute into an aligned annulus and its clamping rings and for upsetting the ends of the core to secure the rings in position.

58. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; means actuated in timed relationship with the operation of the intermittent moving means for supplying clamping rings to the annulus of segments at another station of the conveyor; a chute containing tubular cores, the lowermost core in the chute being in axial alignment with an annulus of segments and clamping rings at still another station of the conveyor; means actuated in timed relationship with the operation of the intermittent moving means for moving the lowermost core in the chute into an aligned annulus and its clamping rings; and means located at a conveyor station other than the transfer station or the ring assembling station for upsetting the ends of the core to secure the rings in position.

59. A commutator assembling machine comprising, in combination, means for assembling an annulus of segments; a conveyor having a plurality of workholders; means for intermittently moving the conveyor; means actuated in timed relationship with the operation of the intermittent moving means for transferring an annulus of segments from the assembling means to a workholder at a certain station of the conveyor; means actuated in timed relationship with the operation of the intermittent moving means for supplying clamping rings to the annulus of segments at another station of the conveyor; a chute containing tubular cores, the lowermost core in the chute being in axial alignment with an annulus of segments and clamping rings at still another station of the conveyor; means actuated in timed relationship with the operation of the intermittent moving means for moving the lowermost core in the chute into an aligned annulus and its clamping rings; and means located at a conveyor station other than the transfer station or the ring assembling station for upsetting the ends of the core to secure the rings in position.

60. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; chutes containing clamping rings leading to another station of the conveyor; fluid pressure operated means for moving the lowermost clamping rings in the chutes into proper assembling position with an annulus; a controller for admitting fluid pressure to the fluid pressure operated means; and means for actuating the intermittent moving means and the controller in timed relation.

61. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; chutes containing clamping rings leading to another station of the conveyor; fluid pressure operated means for moving the lowermost clamping rings in the chutes into proper assembling position with an annulus; fluid pressure operated means for transferring an annulus of segments from the assembling means to a workholder at a certain station of the conveyor; means for intermittently moving the conveyor; chutes containing clamping rings leading to another station of the conveyor; fluid pressure operated means for moving the lowermost clamping rings in the chutes into proper assembling position with an annulus; a controller for admitting fluid pressure to all fluid pressure operated means; and means for actuating the intermittent moving means and the controller in timed relation.

62. A commutator assembling machine comprising, in combination, means for assembling an annulus of segments; a conveyor having a plurality of workholders; means for transferring an annulus of segments from the assembling means to a workholder at a certain station of the conveyor; means actuated in timed relationship with the operation of the intermittent moving means for supplying clamping rings to the annulus of segments at another station of the conveyor; a chute containing tubular cores, the lowermost core in the chute being in axial alignment with an annulus of segments and clamping rings at still another station of the conveyor; fluid pressure operated means for moving the lowermost core in the chute into an aligned annulus and its clamping rings; a controller for admitting fluid pressure to the fluid pressure operated means; and means for actuating the intermittent moving means and the controller in timed relation.

63. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; means actuated in timed relationship with the operation of the intermittent moving means for supplying clamping rings to the annulus of segments at another station of the conveyor; a chute containing tubular cores, the lowermost core in the chute being in axial alignment with an annulus of segments and clamping rings at still another station of the conveyor; fluid pressure operated means for moving the lowermost core in the chute into an aligned annulus and its clamping rings and for upsetting the ends of the core to secure the rings in position; a controller for admitting fluid pressure to the fluid pressure operated means; and means for actuating the intermittent moving means and the controller in timed relation.

64. A commutator assembling machine comprising in combination, means for assembling an annulus of segments; a conveyor having a plurality of workholders; fluid pressure operated means for transferring an annulus of segments from the assembling means to a workholder at a certain station of the conveyor; means for intermittently moving the conveyor; chutes containing a supply of clamping rings, the lowermost rings in the chutes being in axial alignment with an annulus of segments at another station of the conveyor; fluid pressure operated means for moving the lowermost clamping rings in the chutes into proper assembling position with an annulus; a chute containing tubular cores, the lowermost core in the chute being in axial alignment with an annulus of segments and clamping rings at still another station of the conveyor; fluid pressure operated means for moving the lowermost core in the chute into an aligned annulus and its clamping rings; and a single controller for simultaneously admitting fluid pressure to all fluid pressure operated means.

65. A commutator assembling machine comprising, in combination, means for assembling an annulus of segments; a conveyor having a plurality of workholders; means for transferring an annulus of segments from the assembling means to a workholder at a certain station of the conveyor; means for intermittently moving the conveyor; chutes containing a supply of clamping rings, the lowermost rings in the chutes being in axial alignment with an annulus of segments at another station of the conveyor; fluid pressure operated means for moving the lowermost clamping rings in the chutes into proper assembling position with an annulus; a chute containing tubular cores, the lowermost core in the chute being in axial alignment with an annulus of segments and clamping rings at still another station of the conveyor; fluid pressure operated means for moving the lowermost core in the chute into an aligned annulus and its clamping rings; a controller for admitting fluid pressure to all fluid pressure operated means; and means for actuating the intermittent moving means and the controller in timed relation.

66. A commutator assembling machine comprising, in combination, means for assembling an annulus of segments; a conveyor having a plurality of workholders; fluid pressure operated means for transferring an annulus of segments from the assembling means to a workholder at a certain station of the conveyor; means for intermittently moving the conveyor; chutes containing a supply of clamping rings; the lowermost rings in the chutes being in axial alignment with an annulus of segments at another station of the conveyor; fluid pressure operated means for moving the lowermost clamping rings in the chutes into proper assembling position with an annulus; a chute containing tubular cores, the lowermost core in the chute being in axial alignment with an annulus of segments and clamping rings at still another station of the conveyor; fluid pressure operated means for moving the lowermost core in the chute into an aligned annulus and its clamping rings; a controller for admitting fluid pressure to all fluid pressure operated means; and means for actuating the controller and the intermittent moving means in timed relation.

67. A commutator assembling machine, comprising, in combination, means for assembling an annulus of segments; a conveyor having a plurality of workholders; fluid pressure operated means for transferring an annulus of segments from the assembling means to a workholder at a certain station of the conveyor; means for intermittently moving the conveyor; chutes containing a supply of clamping rings, the lowermost rings in the chutes being in axial alignment with an annulus of segments at another station of the conveyor; fluid pressure operated means for moving the lowermost clamping rings in the chutes into proper assembling position with an annulus; a chute containing tubular cores, the lowermost core in the chute being in axial alignment with an annulus of segments and clamping rings at still another station of the conveyor; fluid pressure operated means for moving the lowermost core in the chute into an aligned annulus and its clamping rings and for upsetting the ends of the core to secure the rings in position; a controller for admitting fluid pressure to all fluid pressure operated means; and means for actuating the controller and the intermittent moving means in timed relation.

68. A commutator assembling machine comprising, in combination, means for assembling an annulus of segments; a conveyor having a plurality of workholders; fluid pressure operated means for transferring an annulus of segments from the assembling means to a workholder at a certain station of the conveyor; means for intermittently moving the conveyor; chutes containing a supply of clamping rings, the lowermost rings in the chutes being in axial alignment with an annulus of segments at another station of the conveyor; fluid pressure operated means for moving the lowermost clamping rings in the chutes into proper assembling position with an annulus; a chute containing tubular cores, the lowermost core in the chute being in axial alignment with an annulus of segments and clamping rings at still another station of the conveyor; fluid pressure operated means for moving the lowermost core in the chute into an aligned annulus and its clamping rings; fluid pressure operated means located at a station other than the transfer station or the ring assembly station of the conveyor for upsetting the ends of the core to secure the rings in position; a controller for admitting fluid pressure to all fluid pressure operated means; and means for actuating the controller and the intermittent moving means in timed relation.

69. In a commutator assembling machine, the combination of a workholder having a cylindrical opening for receiving a pre-assembly consisting of an annulus of segments and clamping rings; two die members on opposite sides of the pre-assembly, at least one of which is movable; means for supporting a core between the die members before assembly with the annulus; means for moving the movable die member to cause the core to move within the annulus and both ends of the core to be upset against the clamping rings; and means for forcing the clamping rings against the annulus of segments while the core is being upset.

70. In a commutator assembling machine, the combination of a workholder having a cylindrical opening for receiving a pre-assembly consisting of an annulus of segments and clamping rings; two die members on opposite sides of the pre-assembly, at least one of said die members being movable; means for supporting a core between the die members before assembly with the annulus; means for moving the movable die member to cause the core to move within the annulus and both ends of the core to be upset against the clamping rings; clamping members engageable with the clamping rings, one of said clamping members being movable with the movable die member; and means yieldingly transmitting motion from said movable die member to said movable clamping member.

71. In a commutator assembling machine, the combination of a workholder having a cylindrical opening for receiving a pre-assembly consisting of an annulus of segments and clamping rings; two die members on opposite sides of the pre-assembly, at least one of said die members being movable; clamping members engageable with the clamping rings, one of said clamping members being movable with the movable die member and receiving and guiding a tubular core intermediate the pre-assembly and said movable die member; means for moving the movable die member to cause the core on the clamping member to move within the annulus and to cause both ends of the core to be upset against the clamping rings; and means yieldingly transmitting motion from said die member to said movable clamping member.

72. In a commutator assembling machine, the combination of a workholder having a cylindrical opening for receiving a pre-assembly consisting of an annulus of segments and clamping rings; two die members on opposite sides of the pre-assembly, at least one of said die members being movable; a chute for containing a supply of stacked tubular cores; clamping members engageable with the clamping rings, one of said clamping members being movable with the movable die member and forming the bottom of the chute and guiding the lowermost core therein, said core being located between the pre-assembly and the movable die member; means for moving the movable die member to cause the core on the clamping member to move within the annulus and to cause both ends of said core to be upset against the clamping rings; and means yieldingly transmitting motion from the movable die member to said movable clamping member.

73. In a commutator assembling machine, the combination of a conveyor having cylindrical openings each for receiving at a certain station of the conveyor a pre-assembly consisting of an annulus of segments; die members on opposite sides of the pre-assembly; clamping members on opposite sides of the pre-assembly movable respectively, with the die-members one of said clamping members locating a tubular core between the pre-assembly and the associated die member; a cylinder and a piston therein for moving said one pair of die and clamping members toward the assembly; another cylinder and a piston therein for moving the other pair of die and clamping members toward the assembly, said cylinders being of such relative capacity that, upon concurrent admission of fluid pressure to both cylinders, that clamping member which locates the core arrives in clamping position at or after the other clamping member arrives in clamping position.

74. In a commutator assembling device, the combination of chutes for containing insulating and metallic segments respectively; a track; means for pushing an insulating segment from a chute to the entrance of the track; and means for permitting a metal segment to move by gravity from a chute to the entrance of the track and to be disposed alongside of the insulating segment.

75. In a commutator assembling device, the combination of chutes for containing insulating and metallic segments respectively; a track, means for pushing an insulating segment from a chute to the entrance of the track and means responsive to said pushing means for permitting a metal segment to move by gravity from a chute to the entrance of the track and to be disposed alongside the insulating segment.

76. In a commutator assembling machine, the combination of a segment receiving track; means for directing the movement of a group of one species of segments in end to end relation; means for directing the movement of a group of another species of segments in side by side relation, said means being so related that the foremost segments of both groups are located in side by side relation; and means for causing transfer of the two foremost segments simultaneously in side by side relation to the entrance of the track.

77. In a commutator assembling machine, the combination of a track for receiving segments; means for directing the movement of a group of one species of segments in end to end relation and supported on their backs; means for directing the movement of a group of another species of segments in side by side relation and supported on their backs, said means being so related that the foremost segments of both groups are located in side by side relation; and means for causing transfer of the two foremost segments simultaneously in side by side relation to the entrance of the track.

78. In a commutator assembling machine, the combination of a track for receiving segments, the supporting plane of said track supporting the segments on their backs; means for directing the movement of a group of one species of segments in end to end relation and supported on their backs; means for directing the movement of a group of another species of segments in side by side relation and supported on their backs, said means being so related with each other and with the track that the foremost segments of both groups are located in side by side relation and that their backs are lying in a plane substantially flush with the supporting plane of the track; and means for causing transfer of the two foremost segments simultaneously in side by side relation to the entrance of the track.

79. In a commutator assembling device, the combination of a segment receiving track; a first chute lying in a plane perpendicular to the supporting plane of the track and to the direction of movement of the segments on said track, said chute containing one species of segments in end to end order and the foremost segment therein resting on its back; a second chute lying in a plane transverse to the supporting plane of the track and parallel to the direction of movement of the segments on said track, said second chute containing another species of segments, the foremost segment therein being disposed alongside the lowermost segment in the first chute with its back in substantially the same plane as the back of the foremost segment in said first chute; and means for causing transfer of the foremost segments in both chutes to the entrance of the track.

80. In a commutator assembling device the combination of a segment receiving track; a first chute lying in a plane perpendicular to the supporting plane of the track and to the direction of movement of the segments on said track, said chute containing one species of segments in end to end order and being so shaped that all segments tend to leave said chute by gravity and that the lowermost segment rests on its back; a second chute lying in a plane transverse to the supporting plane of the track and parallel to the direction of movement of the segments on said track, said second chute containing another species of segments in side by side order and the foremost segment therein being disposed alongside the lowermost segment in the first chute with its back in the same plane as the back of the foremost segment in said first chute; means for pushing the foremost segment in the second chute to the entrance of the track; and means responsive to the pushing means for permitting the lowermost segment in the first chute to slide by gravity to the entrance of the track and alongside the pushed segment.

81. In a commutator assembling device, the combination of a segment receiving track; a first chute lying in a plane perpendicular to the supporting plane of the track and to the direction of movement of the segments on said track, said chute containing one species of segments in end to end order and the foremost segment therein resting on its back; a second chute lying in a plane transverse to the supporting plane of the track and parallel to the direction of movement of the segments on said track, said second chute containing another species of segments in side by side order and being so constructed that the lowermost segment therein is disposed alongside the foremost segment in the first chute with its back in substantially the same plane as the back of the latter segment and that all segments therein tend to leave said chute by gravity; and means for causing transfer of the foremost segments in both chutes to the entrance of the track.

82. In a commutator assembling device, the combination of a segment receiving track; a chute lying in a plane perpendicular to the supporting plane of the track and to the direction of movement of the segments on said track, said chute containing segments in end to end order and being so shaped that all segments tend to leave said chute by gravity and that the lowermost segment rests on its back, that portion of the chute which supports the lowermost segment on its back merging into the supporting plane of the track; and means for releasing the lowermost segment in the chute to permit that segment to side to the track entrance.

83. In a commutator assembling device, the combination of a segment receiving track; a first chute lying in a plane perpendicular to the supporting plane of the track and to the direction of movement of the segments on said track, said chute containing one species of segments in end to end order and being so shaped that all segments tend to leave said chute by gravity and that the lowermost segment is resting on its back, that portion of the chute supporting the lowermost segment on its back merging into the supporting plane of the track; a second chute lying in a plane transverse to the supporting plane of the track and parallel to the direction of movement of the segments on said track, said second chute containing another species of segments in side by side relation and being so shaped that the foremost segment therein is disposed alongside the lowermost segment in the first chute and is supported on its back, that portion of the second chute supporting the foremost segment therein on its back merges into the supporting plane of the track and is disposed laterally of the track entrance; means for pushing the lowermost segment in the second chute to the track entrance; and means responsive to said pushing means for permitting the lowermost segment in the first chute to slide to the track entrance and alongside the pushed segment.

84. In a commutator assembling device, the combination of a segment receiving track; a chute lying in a plane perpendicular to the supporting plane of the track and parallel to the direction of movement of the segments on said track, said chute containing segments in side by side order and being so shaped that the lowermost segment rests on its back, that portion of the chute supporting the lowermost segment on its back merges into the supporting plane of the track and is disposed laterally of the track entrance; stationary means preventing lateral movement relative to the track of segments in the chute other than the lowermost segment therein; and means for pushing the lowermost segment from the chute to the track entrance.

85. In a commutator assembling device, the combination of a magazine for containing a train of segments in side by side relation; a pusher bar reciprocable transversely of the magazine and having a notch for receiving the foremost segment in the magazine and for delivering it into a position laterally of the magazine, said pusher bar being so related to the magazine exit that only the segment in said notch clears the magazine exit for movement in unison with the pusher bar; and a spring closed gate having a shoulder for engaging an edge of a delivered segment to retain the latter in delivered position when the pusher bar retracts toward the magazine, said gate being cammed open against its tendency to close by a segment while being delivered.

86. In a commutator assembling device, the combination of a first magazine for containing a train of one species of segments in side by side relation; a second magazine disposed at right angles to the first magazine and containing a train of another species of segments in end to end relation; a pusher bar reciprocable transversely of the first magazine and having a notch for receiving the foremost segment in said first magazine and for delivering it into a position laterally of said first magazine, said pusher bar serving as a partition to separate the foremost segments of the two magazines; and means for causing delivery of the foremost segment in the second magazine into a position alongside a delivered segment from the first magazine.

87. In a commutator assembling device, the combination of a first magazine for containing a train of one species of segments in side by side relation; a second magazine disposed at right angles to the first magazine and containing a train of another species of segments in end to end relation; a pusher bar reciprocable transversely of the first magazine and having a notch for receiving the foremost segment in said first magazine and for delivering it into a position laterally of the first magazine, said pusher bar serving as a partition to separate the foremost segments of the two magazines; a spring-closed gate having a shoulder for engaging an edge of a delivered segment to retain the same in delivered position when the pusher bar retracts toward the first magazine, said gate being cammed open against its tendency to close by a segment while being delivered; and means for causing delivery of the foremost segment in the second magazine.

88. In a commutator assembling device, the combination of a magazine for containing a train of one species of segments in side by side relation; a chute lying in a plane at right angles to the magazine for receiving another species of segments in end to end order, said chute being so shaped that the segments tend to leave said chute by gravity and that the lowermost segment therein is disposed parallel to the foremost segment in the magazine; a pusher bar reciprocable transversely of the magazine and operable to move the foremost segment in the magazine into a position laterally of said magazine; a gate for retaining the segments in the chute; and means responsive to movement of the pusher bar for opening the gate to permit the lowermost segment in the chute to slide alongside a delivered segment from the magazine.

89. In a commutator assembling device, the combination of a magazine for containing a train of one species of segments in side by side relation; a chute lying in a plane at right angles to the magazine for receiving segments of another species of segments in end to end order, said chute being so shaped that the segments tend to leave said chute by gravity and that the lowermost segment therein is disposed parallel to the foremost segment in the magazine; a pusher bar reciprocable transversely of the magazine and operable to move the foremost segment in the magazine into a position laterally of said magazine, said pusher bar being interposed between the lowermost segment in the chute and the foremost segment in the magazine; a spring closed gate having a shoulder for engaging an edge of a delivered segment from the magazine to retain the same in delivered position when the pusher bar retracts toward the magazine, said gate being cammed open against its tendency to close by a segment while being delivered; a second gate for retaining segments in the chute; and means responsive to movement of the pusher bar in a certain direction for opening said second gate to permit the lowermost segment in the chute to slide alongside a delivered segment from the magazine.

90. In a commutator assembling machine, the combination of a track for receiving commutator segments; a pusher for moving the segments sidewise into the track; a member located adjacent the track entrance and adapted to offer yielding resistance to movement of segments into the track, said member being spaced from the pusher in retracted position so as to provide for the reception of segments between said pusher and said member; and means for effecting the delivery of segments into said space.

91. In a commutator assembling machine, the combination of a track for receiving commutator segments; a pusher for moving the segments sidewise into the track; a member located adjacent the track entrance and adapted to offer yielding resistance to movement of segments into the track, said member being spaced from the pusher in retracted position so as to provide for the reception of segments between said pusher and said member; and means for effecting the delivery of segments by gravity into said space.

92. In a commutator assembling machine, the combination of a track for receiving commutator segments; a pusher for moving the segments sidewise into the track; a member located adjacent the track entrance and adapted to offer yielding resistance to movement of segments into the track, said member being spaced from the pusher in retracted position so as to provide for the reception of segments between said pusher and said member; a second pusher movable at right angles to the first mentioned pusher for moving segments into said space.

93. In a commutator assembling machine, the combination of a track for receiving groups of commutator segments, each group comprising a metallic segment and an insulating segment; a pusher for moving the groups of segments sidewise into the track; a member located adjacent the track entrance and adapted to offer yielding resistance to movement of the segments into the track, said member being spaced from the pusher in its retracted position so as to provide for the reception of a group of segments between said pusher and said member; means for effecting the delivery of metal segments by gravity to said space; and means for delivering an insulating segment into said space, said means including a pusher movable at right angles to the first mentioned pusher.

94. In a commutator assembling machine, the combination of a track for receiving segments having bar portions and dove-tail tangs, said track being adapted to guide the segments as they move sidewise along the track, said track having side walls conforming to the dove-tail tangs; means for effecting endwise delivery of a segment to the entrance of the track; and a stationary member having a portion shaped so as to engage a notch defining the leading edge of a dove-tail tang as the segment is delivered to the track entrance.

95. In a commutator assembling machine, the combination of a track for receiving segments having bar portions and dove-tail tangs, said track being adapted to guide the segments as they move sidewise along the track, said track having side walls conforming to the dove-tail tangs; means for guiding a segment endwise as it gravitates to the entrance of the track; and a stationary member having a portion shaped so as to engage a notch defining the leading edge of a dove-tail tang as the segment is delivered to the track entrance.

96. In a commutator assembling machine, the combination of a track for receiving segments having bar portions and dove-tail tangs, said track being adapted to guide the segments as they move side-wise along the track, said track having said side walls conforming to the dove-tail tangs; means for moving a segment endwise to the entrance of the track and including a pusher bar having a portion which provides a shoulder conforming to the trailing edge of the dove-tail tang; and a stationary member having a portion shaped so as to engage a notch defining the leading edge of a dove-tail tang as the segment is delivered to the track entrance.

97. In a commutator assembling device the combination of chutes for containing insulating and metallic segments respectively; a track; means for pushing an insulating segment from a chute to the entrance of the track; means for permitting a metal segment to move by gravity from a chute to the entrance of the track and to be disposed alongside the insulating segment; and means for transferring a group of insulating and metal segments into the track.

98. In a commutator assembling device the combination of chutes for containing insulating and metallic segments respectively; a track; means for pushing an insulating segment from a chute to the entrance of the track; means responsive to said pushing means for permitting a metal segment to move to the entrance of said track and to be disposed alongside the insulating segment; and means for transferring a group of insulating and metal segments into the track.

99. In a commutator assembling device, the combination of a track for receiving segments in side by side relation and resting on their backs; means for causing deposition at the entrance to the track of a group of segments in side by side relation and resting on their backs; and means for transferring the group of segments into the track.

100. In a commutator assembling device, the combination of a track for receiving groups of species of segments alternating in a certain order, all resting on their backs in side by side relation; means for causing deposition at the entrance to the track of a group of orderly arranged alternating species of segments in side by side relation and resting on their backs; and means for transferring the group of segments into the track.

101. In a commutator assembling device, the combination of a track for receiving segments in side by side relation and resting on their backs; means for causing deposition at the entrance to the track of a group of segments in side by side relation and resting on their backs by endwise movement of the segments of the group in a direction transverse to the track; and means operating in the direction of the track for moving the group into the track.

102. In a commutator assembling device, the combination of a track for receiving segments in side by side relation and resting on their backs; means for causing deposition at the entrance to the track of a group of segments in side by side relation and resting on their backs; and a bar for pushing the group of segments into the track, said bar being reciprocable in the direction of the track and having a three point engagement with the nearest segment.

103. In a commutator assembling device, the combination of a track for receiving in side by side relation segments having bar portions and tang portions, the supporting plane of said track supporting the segments on their bar portions; means for causing deposition at the entrance to the track of a group of segments in side by side relation and resting on their bar portions; and a bar for pushing the group of segments into the track, said bar being reciprocable in the direction of the track and having three engaging surfaces, two thereof engaging the nearest segment of the group close to the supporting plane of the track at spaced points near the ends of the bar portions and one engaging the center of the tang.

104. In a commutator assembling device, the combination of a track for receiving in side by side relation segments having bar portions and tang portions, the supporting plane of said track supporting the segments on their bar portions; means for automatically causing deposition at the entrance to the track of a group of segments in side by side relation and resting on their bar portions; a bar for pushing the group of segments into the track, said bar being rapidly reciprocated in the direction of the track; a yielding plunger the end of which is in close proximity to the top edge of the tang of the segment closest to the track and is elevated against its tendency to move toward the track by the group of segments when pushed into the track whereby to prevent overtravel of the group of segments due to the rapid reciprocation of the bar.

105. In a commutator assembling device, the combination of a track for receiving in side by side relation segments having bar portions and tang portions, the supporting plane of said track supporting the segments on their bar portions; means for causing deposition at the entrance to the track of a group of segments in side by side relation and resting on their bar portions; a bar for pushing the group of segments into the track, said bar being reciprocable in the direction of the track; a yielding plunger whose end is in close proximity to the top edge of the tang of the segment closest to the track and is elevated against its tendency to move toward the track by the group of segments when pushed into the track whereby to prevent overtravel of the group of segments due to the rapid reciprocation of the bar; and yielding means tending to prevent the segments in the track from overtraveling and becoming skewed when additional groups of segments are pushed into the track.

106. In a commutator assembling machine the combination of a track adapted to receive commutator segments; a pusher bar for moving segments sidewise into the track; spring operated means for advancing the pusher bar toward the track; means for retracting the pusher bar and comprising a single acting cam, a cam follower, a lever carrying the follower, a second lever pivotally supporting the first lever and connected with the pusher bar, said levers having engaging surfaces so constructed and located that the first lever cooperates with the second lever so as to move the pusher bar from advanced to retracted position in response to actuation of the first lever by the cam, but that said first lever may be operated by the cam independently of the second lever in case the pusher bar is held in retracted position.

107. In a commutator assembling device, the combination which comprises a plurality of magazines respectively holding metal segments and insulating segments, a track for receiving a row of segments, devices for effecting delivery of segments from the magazines into the track, an annulus forming device, and means actuated in timed relation with the operation of the devices for moving the segments within the track into the annulus forming device when a certain number of segments have been placed in the track.

108. In a commutator assembling device, the combination which comprises a plurality of magazines respectively holding metal segments and insulating segments, a track for receiving a row of segments, means for effecting delivery of a group of segments (including one of each kind) in a linear direction from the magazines to a location adjacent the entrance to the track, means for pushing the group into the track, an annulus forming device; and means actuated in timed relation with a predetermined number of operations of the pushing means for moving the segments within the track into the annulus forming device when a certain number of groups of segments have been placed in the track.

109. In a commutator assembling machine, the combination of an annulus forming device; a segment receiving track leading to the device; means for automatically causing deposition of segments at the entrance to the track; a continuously reciprocating bar for pushing segments into the track; and means for conveying segments in the track into the annulus forming device, said conveying means being so timed with respect to the bar that it starts to operate when the bar has pushed the last of a predetermined number of segments into the track, and operating to convey the segments a distance sufficient to provide clearance for the next segments to be pushed into the track.

110. In a commutator assembling machine, the combination of an annulus forming device; a segment receiving track leading to the device; means for automatically causing continuous deposition at the entrance to the track of a group of segments standing on their backs; a continuously reciprocating bar for pushing each deposited group of segments into the track; and a continuously moving conveyor carrying a lug for conveying segments in the track into the annulus forming device, the conveyor being so timed with respect to the bar that the lug starts to move a predetermined number of segments in the track when the bar starts to retract from the track and conveys the segments sufficiently to provide clearance in the track for the next group of segments to be pushed into the track.

111. In a commutator assembling machine, the combination of an annulus forming device; a segment receiving track leading to the device, means for causing continuous deposition of a group of segments at the entrance to the track; a bar for pushing each deposited group of segments into the track; means for continuously reciprocating the bar; a continuously moving conveyor comprising an endless chain carrying a lug and being guided over two sprocket wheels, one being adjacent the entrance to the track and the other being adjacent the device, and that portion of the chain between the sprocket wheels which is closest to the track being parallel to the latter; means operating in timed relation to the bar reciprocating means for rotating one of the sprocket wheels at such a speed that the lug engages the last of a predetermined number of groups of segments in the track when the bar starts to retract from the track and conveys the segments sufficiently to provide clearance in the track for the next group of segments to be pushed into the track.

112. In a commutator assembling machine, the combination of an annular track formed by a cylindrical member and a member surrounding the cylindrical member and spaced therefrom to provide an annular track for receiving an annulus of commutator segments; a workholder movable into axial alignment with the annular track; and means for pushing said annulus of segments endwise from the annular track into the workholder.

113. In a commutator assembling machine, the combination of an annular track formed by a cylindrical member and a member surrounding the cylindrical member and spaced therefrom to provide an annular track for receiving an annulus of commutator segments; a workholder movable into axial alignment with the annular track; and a sleeve surrounding the cylindrical member for pushing the annulus of segments endwise into the workholder.

114. In a commutator assembling machine, the combination of an annular track formed by a rotatable cylindrical member and a member surrounding the cylindrical member and spaced therefrom to provide an annular track for receiving an annulus of commutator segments; a vane carried by the cylindrical member; a workholder movable into axial alignment with the annular track; means for delivering a row of segments against the vane transversely to the axis of the cylindrical member; and means for pushing the annulus of segments endwise into the workholder.

115. In a commutator assembling machine, the combination of an annular track formed by a cylindrical rotatable member and a member surrounding the cylindrical member and spaced therefrom to provide an annular track for receiving an annulus of commutator segments; a workholder movable into axial alignment with the annular track; a vane yieldingly carried by the cylindrical member and retractable therein; means for delivering a row of segments against the vane in a direction transversely to the axis of the cylindrical member; and a sleeve surrounding the cylindrical member for pushing the annulus of segments endwise into the workholder, said sleeve causing the vane to be retracted into the cylindrical member.

116. In a commutator assembling machine, the combination which comprises an annular track for receiving an annulus of commutator segments, a workholder movable into alignment with the annular track, means for resiliently embracing an annulus of segments within the workholder, and means for pushing the annulus of segments from the annular track into the resilient embracing means.

117. In a commutator assembling machine, the combination which comprises, an annular track formed by a cylindrical rotatable member and stationary parts providing a circular recess surrounding the cylindrical member; a vane carried by the cylindrical member and revolving in the track; a sleeve supporting the cylindrical member rotatable therewith and having an end adjacent the ends of the segments in the track; a workholder movable into alignment with the annular track; means for moving the sleeve axially to push the annulus of segments from the annular track into the workholder; and means for restraining axial movement of the cylindrical member.

118. In a commutator assembling machine, the combination of a first track for receiving a row of segments; an annular track formed by a cylindrical rotatable member and stationary parts providing a circular recess surrounding the cylindrical member and leading to the first track; a vane yieldingly carried by the cylindrical member and retractable therein, and revolving in the track; a workholder movable into axial alignment with the annular track; a sleeve supporting the cylindrical member and rotatable therewith and adapted to push an annulus of segments into the aligned workholder, said sleeve causing the vane to be retracted into the cylindrical member; means for longitudinally moving the sleeve; and means for restraining axial movement of the cylindrical member.

119. In a commutator assembling machine, the combination of a straight track for receiving a row of segments having bar portions and tang portions with their bar portions resting on the supporting plane of the track, an annular track formed by a cylindrical rotatable member and stationary parts providing a circular recess surrounding the cylindrical member, the recess wall merging into the supporting plane of the straight track; a vane yieldingly carried by the cylindrical member and retractable therein, said vane being engaged by the tang of the foremost segment of a row when entering the annular track; yielding means engaging the bar portions of the segments as they enter the annular track and forming a yieldable wall portion thereof; a workholder movable into axial alignment with the annular track; a sleeve supporting the cylindrical member and rotatable therewith and adapted to push an annulus of segments from the annular track into the aligned workholder, said sleeve causing the vane to be retracted into the cylindrical member; means for axially moving the sleeve; and means for restraining axial movement of the cylindrical member.

120. In a commutator assembling machine the combination of an annular track formed by a rotatable and longitudinally immovable cylindrical member and stationary parts providing a circular recess surrounding the cylindrical member; a vane carried by the cylindrical member; a workholder movable into axial alignment with the annular track; a sleeve supporting the cylindrical member and rotatable therewith and adapted to push an annulus of segments into the aligned workholder; fluid pressure means including a piston for moving the sleeve axially; a swivel joint connecting the piston with said sleeve; and means for restraining axial movement of the cylindrical member.

121. In a commutator assembling machine, the combination of two stationary spaced bearings; a sleeve slidably and rotatably supported in both bearings and having a longitudinal slot; an annular track for receiving segments, said track being formed by stationary parts providing a circular recess and a cylindrical bar rotatably supported in the sleeve and extending centrally into the circular recess; a vane carried by the cylindrical bar; a spacer interposed between both bearings and slidably supported on the sleeve; a screw pin secured to the spacer and extending through the slot of the sleeve and secured to the cylindrical bar so that the latter is rotatable but longitudinally immovable relative to the bearings and the sleeve is rotatable in unison with the cylindrical bar and longitudinally movable relative thereto; a workholder movable into axial alignment with the annular track; and means for longitudinally moving the sleeve in order to push the annulus of segments from the annular track into the aligned workholder.

122. In a commutator assembling machine, the combination of a segment receiving track; continuously operating means delivering segments into the receiving track; an annulus forming device; means for transferring a predetermined number of segments from the receiving track to the annulus forming device; a workholder movable into alignment with the annulus forming device; and means for transferring the annulus of segments from the annulus forming device to the workholder.

123. In a commutator assembling machine, the combination of a segment receiving track; continuously operating means delivering segments into the receiving track; an annulus forming device; means for transferring a predetermined number of segments from the receiving track to the annulus forming device; a workholder movable into alignment with the annulus forming device; means for transferring the annulus of segments from the annulus forming device to the workholder; means for attaching binding devices to the annulus; and means for transferring the workholder from alignment with the annulus forming device to the means for attaching binding devices.

124. In a commutator assembling machine, the combination of a segment receiving track; continuously operating means delivering segments into the receiving track; an annulus forming device; means for transfering a predetermiend number of segments from the receiving track to the annulus forming device; a conveyor having a plurality of workholders; means for transferring the annulus of segments from the annulus forming device to a workholder at a certain station of the conveyor; means located at other stations of the conveyor for attaching binding devices to the annulus; and means for intermittently moving the conveyor.

125. In a commutator assembling machine the combination of a segment receiving track; chutes containing different species of segments; continuously operating means for causing delivery of segments from the chutes to the track entrance; continuously operating means for pushing the segments at the track entrance into the latter; an annulus forming device; means for transferring a predetermined number of segments from the receiving track to the annulus forming device; a workholder movable into alignment with the annulus forming device; and intermittently operating means for transferring the annulus from the annulus forming device to the workholder.

126. In a commutator assembling machine the combination of magazines containing different species of segments; an annulus forming device; means for transferring a predetermined number of segments from the magazines to the annulus forming device in such manner that different species of segments alternate in a predetermined recurrent sequence; a conveyor having a plurality of workholders; means for transferring a annulus of segments from the annulus forming device to a workholder at a certain station of the conveyor; means located at other stations of the conveyor for attaching binding devices to the annulus; and means for intermittently moving the conveyor.

RUSSELL W. BAKER.
JOHN Q. HOLMES.
ALVA W. PHELPS.